United States Patent
Sandbach

(10) Patent No.: US 6,452,479 B1
(45) Date of Patent: Sep. 17, 2002

(54) DETECTOR CONTRUCTED FROM FABRIC

(75) Inventor: David L. Sandbach, London (GB)

(73) Assignee: Eleksen Limited, London (GB)

( * ) Notice: Subject to any disclaimer, the term of this patent is extended or adjusted under 35 U.S.C. 154(b) by 0 days.

(21) Appl. No.: 09/744,155

(22) PCT Filed: May 4, 2000

(86) PCT No.: PCT/GB00/01550

§ 371 (c)(1),
(2), (4) Date: Jan. 22, 2001

(87) PCT Pub. No.: WO00/72239

PCT Pub. Date: Nov. 30, 2000

Related U.S. Application Data

(63) Continuation-in-part of application No. 09/315,139, filed on May 20, 1999, now abandoned.

(51) Int. Cl.[7] .................................................. H01C 3/00
(52) U.S. Cl. .............................. 338/208; 338/5; 338/47; 338/99; 338/101; 338/114
(58) Field of Search .......................... 338/99, 101, 114, 338/5, 47, 208, 210

(56) References Cited

U.S. PATENT DOCUMENTS

| | | | | |
|---|---|---|---|---|
| 2,445,660 A | * | 7/1948 | Bruestle | 338/99 |
| 2,735,178 A | * | 2/1956 | Adams | 338/101 |
| 3,056,005 A | * | 9/1962 | Larson | 338/47 |
| 3,125,739 A | * | 3/1964 | Deibel et al. | 338/47 |
| 3,398,233 A | * | 8/1968 | Lizasoain | 338/101 |
| 3,911,215 A | | 10/1975 | Hurst et al. | |
| 4,220,815 A | | 9/1980 | Gibson et al. | |
| 4,258,100 A | * | 3/1981 | Fujitani et al. | 338/99 |
| 4,503,416 A | * | 3/1985 | Kim | 338/99 |
| 4,529,959 A | * | 7/1985 | Ito et al. | 338/101 |
| 4,659,873 A | * | 4/1987 | Gibson et al. | 338/99 |
| 4,687,885 A | | 8/1987 | Talmage, Jr., et al. | |
| 4,707,845 A | | 11/1987 | Krein et al. | |
| 4,798,919 A | | 1/1989 | Miessler et al. | |
| 4,876,419 A | * | 10/1989 | Lodini | 338/101 |
| 5,159,159 A | | 10/1992 | Asher | |
| 5,262,778 A | | 11/1993 | Saunders | |
| 5,453,941 A | | 9/1995 | Yoshikawa | |
| 5,686,705 A | | 11/1997 | Conroy et al. | |
| 5,799,533 A | * | 9/1998 | Seki et al. | 338/47 |
| 5,815,139 A | | 9/1998 | Yoshikawa et al. | |
| 5,852,260 A | | 12/1998 | Yoshikawa | |

FOREIGN PATENT DOCUMENTS

| | | |
|---|---|---|
| DE | 41 01 842 | 8/1992 |
| EP | 0261770 A2 | 3/1988 |
| EP | 0 989 509 | 3/2000 |
| JP | 61-231626 | 10/1986 |
| WO | WO 99/60357 | 11/1999 |

OTHER PUBLICATIONS

Patent Abstracts of Japan vol. 011 No. 068 (P–553) Feb. 1987 & JP 61 231626 (ASAHI Chem Ind Co Ltd) Oct. 1986.

* cited by examiner

*Primary Examiner*—Karl D. Easthom
(74) *Attorney, Agent, or Firm*—Nixon & Vanderhye P.C.

(57) ABSTRACT

A position sensor is arranged to detect the position of a mechanical interaction, such as the application of manual pressure. A first fabric layer has electrically conductive fibers machined therein to provide a first conductive outer layer allowing conduction in all directions along the layer. A second fabric layer has electrically conductive fibers machined therein to provide a second conductive outer layer allowing conduction in all directions along the layer. A central layer is disposed between the first outer layer and the second outer layer. The central layer includes conductive elements. A first insulating separating element is disposed between the first conductive outer layer and the conducting elements. A second insulating separating element is disposed between the second conductive outer layer and the conducting elements. The conducting elements provide a conductive path between the first conducting outer layer and the second conducting outer layer at the position of a mechanical interaction.

31 Claims, 21 Drawing Sheets

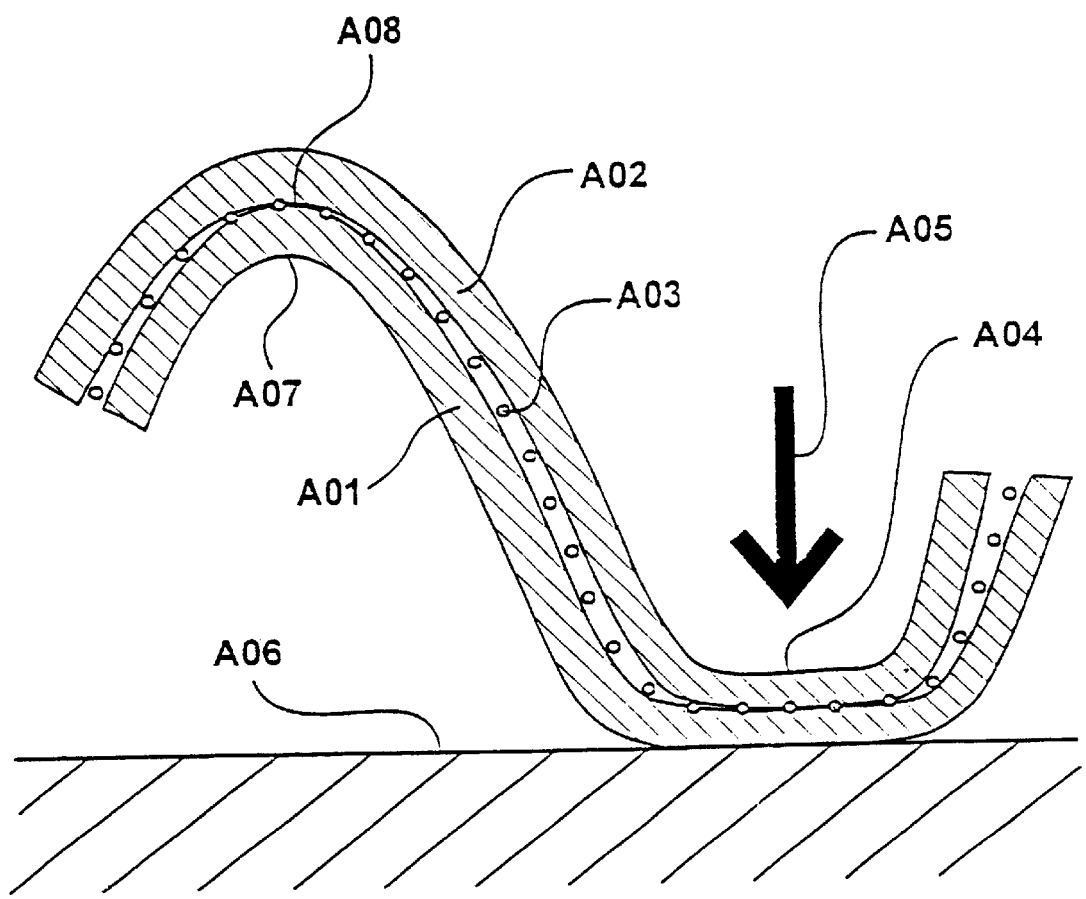
*Figure A*
(Prior Art)

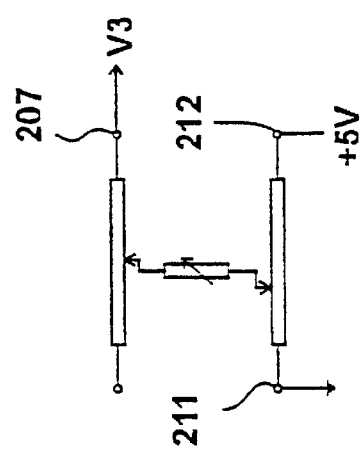
*Figure 15A*
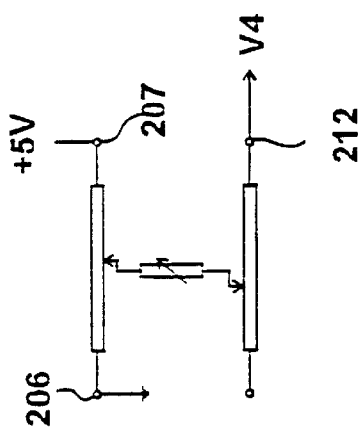
$$\frac{1}{R_V} \sim \propto AREA.FORCE$$
$$R_V \propto \frac{1}{V_1} + \frac{1}{V_2}$$
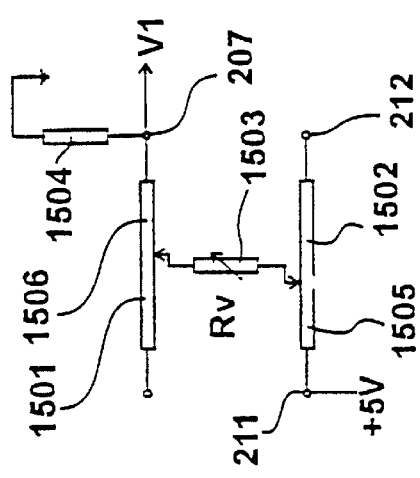
*Figure 15B*
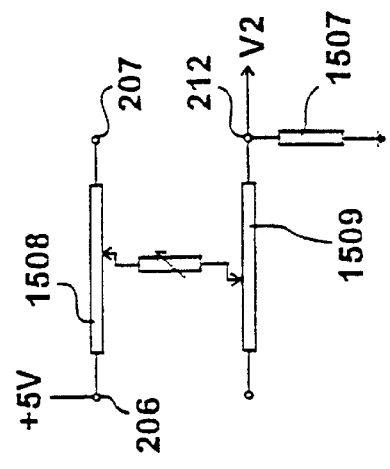
*Figure 15C*
*Figure 15D*

DETECTOR CONTRUCTED FROM FABRIC

REFERENCE TO RELATED APPLICATIONS

The present invention was made by Mr David Lee Sandbach who is resident in the United Kingdom. A permit to file a first application outside the United Kingdom under Section 23(1) of the Patent Act 1977 was obtained on May 19, 1999. The present application claims priority from U.S. patent application Ser. No. 09/315,139 file date May 20, 1999. With respect to the United State's designation, the present application is filed as a continuation-in-part.

FIELD OF THE INVENTION

The present invention relates to a position sensor for detecting the position of a mechanical interaction.

BACKGROUND OF THE INVENTION

A position sensor for detecting the position of a mechanical interaction is disclosed in European Patent publication 0 989 509, equivalent to U.S. patent application Ser. No. 09/298,172, Korean patent application number 99-40363, Japanese patent application number 11-272,513 and Australian patent application 48770/99, all assigned to the present Assignee. The position detector is configured to determine the position of a mechanical interaction. In addition, the detector is also configured to measure the extent of a mechanical interaction in which said representation of the extent of a mechanical interaction is usually made up from components representing the force of the mechanical interaction and the area over which the mechanical interaction takes effect.

A problem with the known position sensor disclosed in the aforesaid patent applications is that it is possible for incorrect measurements to be obtained if the detector is folded in certain orientations. Thus, with the known detector, satisfactory results are obtained if the detector is placed over a flat surface, such as a desk or table etc. However, if the detector is folded over a curvilinear surface, it is possible for erroneous results to be obtained at positions where the detector is folded.

The known detector is fabricated from two conducting layers of fabric with a non-conducting layer positioned therebetween. In order to reduce occurrences of erroneous results, due to folding, it is known to strengthen and thicken the intermediate non-conducting layer. However, when the intermediate layer is strengthened in this way, the response of the detector changes in that it becomes less sensitive to mechanical interactions. Thus, if a mechanical interaction takes the form of a manual operation of a finger upon the detector, for example in order for a position to be determined from which action can then follow, it becomes difficult for the detector to be pressed manually. Similarly, if the intermediate layer is modified so as to make mechanical interactions easier to accomplish, there is then a greater likelihood that erroneous contact may result.

BRIEF SUMMARY OF THE INVENTION

According to an aspect of the present invention, there is provided a position sensor for detecting the position of a mechanical interaction, including: a first fabric layer having electrically conductive fibres machined therein to provide a first conductive outer layer allowing conduction in all directions along said first layer, a second fabric layer having electrically conductive fibres machined therein to provide a second conductive outer layer allowing conduction in all directions along said second layer, a central layer disposed between said first outer layer and said second layer, said central layer including conducting means; a first insulating separating means disposed between said first conductive outer layer and said conducting means; and a second insulating separating means disposed between said second conductive outer layer and said conducting means; wherein said conducting means provides a conductive path between said first conducting outer layer and said second conducting outer layer at a position of a mechanical interaction.

BRIEF DESCRIPTION OF THE SEVERAL VIEWS OF THE DRAWINGS

FIG. A illustrates a known position sensor as described in the prior art;

FIGS. 15A, 15B, 15C and 15D illustrate procedures for measuring the position of a force applied to the position sensor.

BEST MODE FOR CARRYING OUT THE INVENTION

A position sensor of the type described by the prior art is illustrated in the cross-sectional view shown in FIG. A. The sensor has conductive outer layers of fabric A01 and A02, separated by an insulating layer A03. The purpose of the insulating layer is to prevent electrical contact between the outer layers A01 and A02, except at positions of mechanical interaction. For example, at location A04 a force, indicated by arrow A05, presses the sensor against a solid surface A06. The layers are thus pressed into intimate contact and due to the open structure of the insulating layer A03, the outer layers come into contact with each other.

By applying electrical potential gradients across outer layer A01 and measuring the electrical potential of outer layer A02, the location of the mechanical interaction may be determined. In addition, by measuring the current flowing to the outer layer A02, an indication of the size of force A05, or, alternatively, the area over which it applies a pressure to the sensor, may be determined.

A fold A07 in the sensor exemplifies a problem with this type of sensor. The outer layer A01, on the inside of the fold becomes compressed and pushes out against the insulating layer A03. In addition, due to the open structure of the insulating layer, the layer A01 pushes out against the outer layer A02, and thereby produces an electrical contact A08 between the conducting layers. The electrical contact A08 influences the positional voltage measurement and current measurement, and thereby leads to incorrect interpretation of the position and area/force of the mechanical interaction at location A04.

Figure 1:
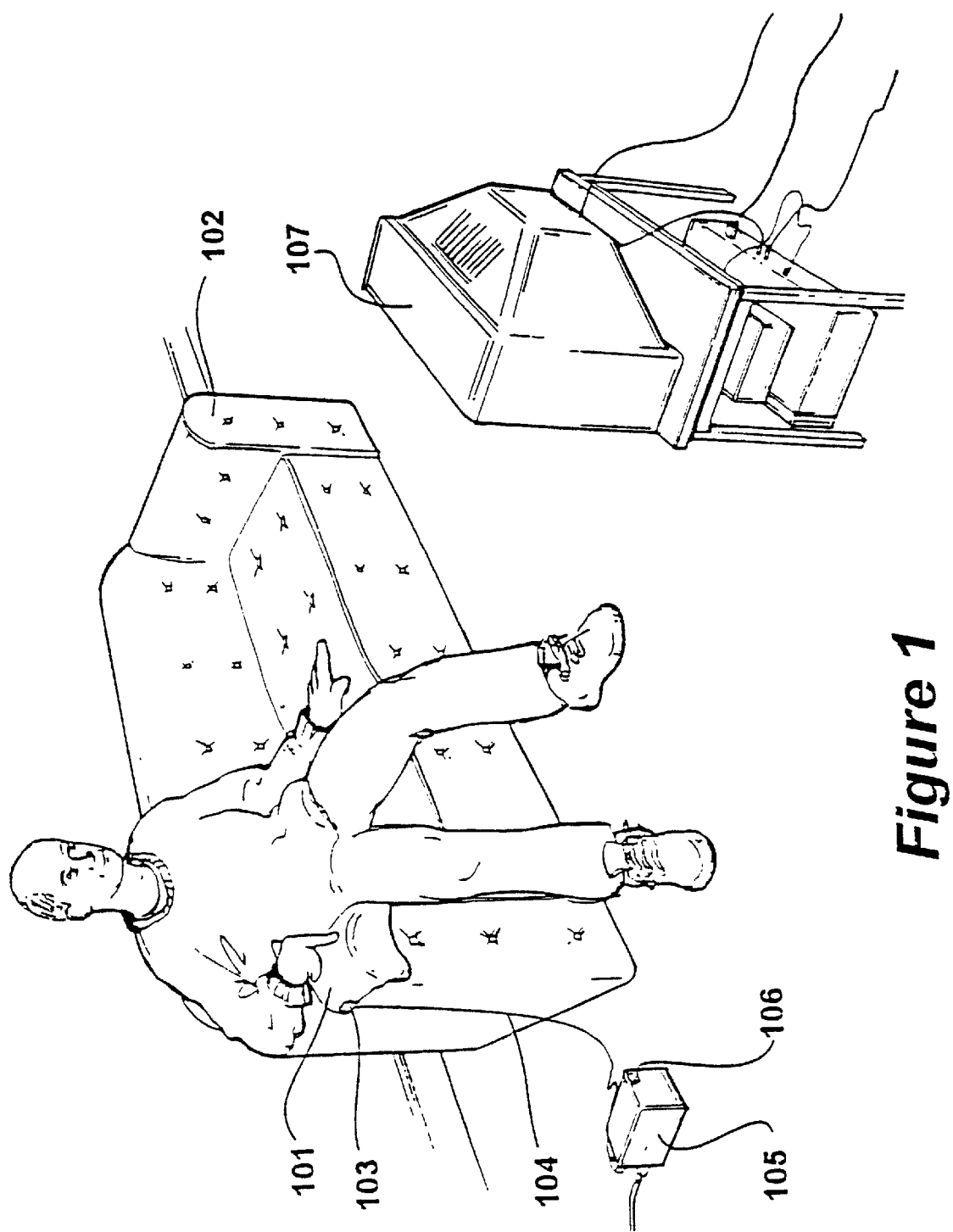
FIG. 1 shows a position sensor embodying the present invention.

A position sensor 101 embodying the present invention is shown in FIG. 1, fabricated from the fabric layers of material and configured to rest on flat and curvilinear surfaces. The sensor responds to mechanical interactions and in the specific application shown in FIG. 1, these mechanical interactions take the form of manual pressure being applied by users in order to make selections.

In the example shown in FIG. 1, the sensor 101 provides a substitute for a television, video recorder or satellite television remote control. In preference to a solid object providing a series of buttons, the detector is substantially fabric and may adopt a shape defined by soft furnishing. In the example shown, the detector 101 is shown as a separate item but in an alternative configuration, the detector could be included as part of soft furnishing, such as sofa 102.

The sensor 101 includes an interface circuit 103 arranged to respond to mechanical interactions and to provide co-ordinate and pressure data over an interface line 104 to a processing device 105. In response to mechanical interactions effected by a user, positional data is conveyed to processing circuit 105 that in turn transmits infra-red data via an infra-red transmitter 106 to audio visual equipment, such as television 107.

Figure 2:
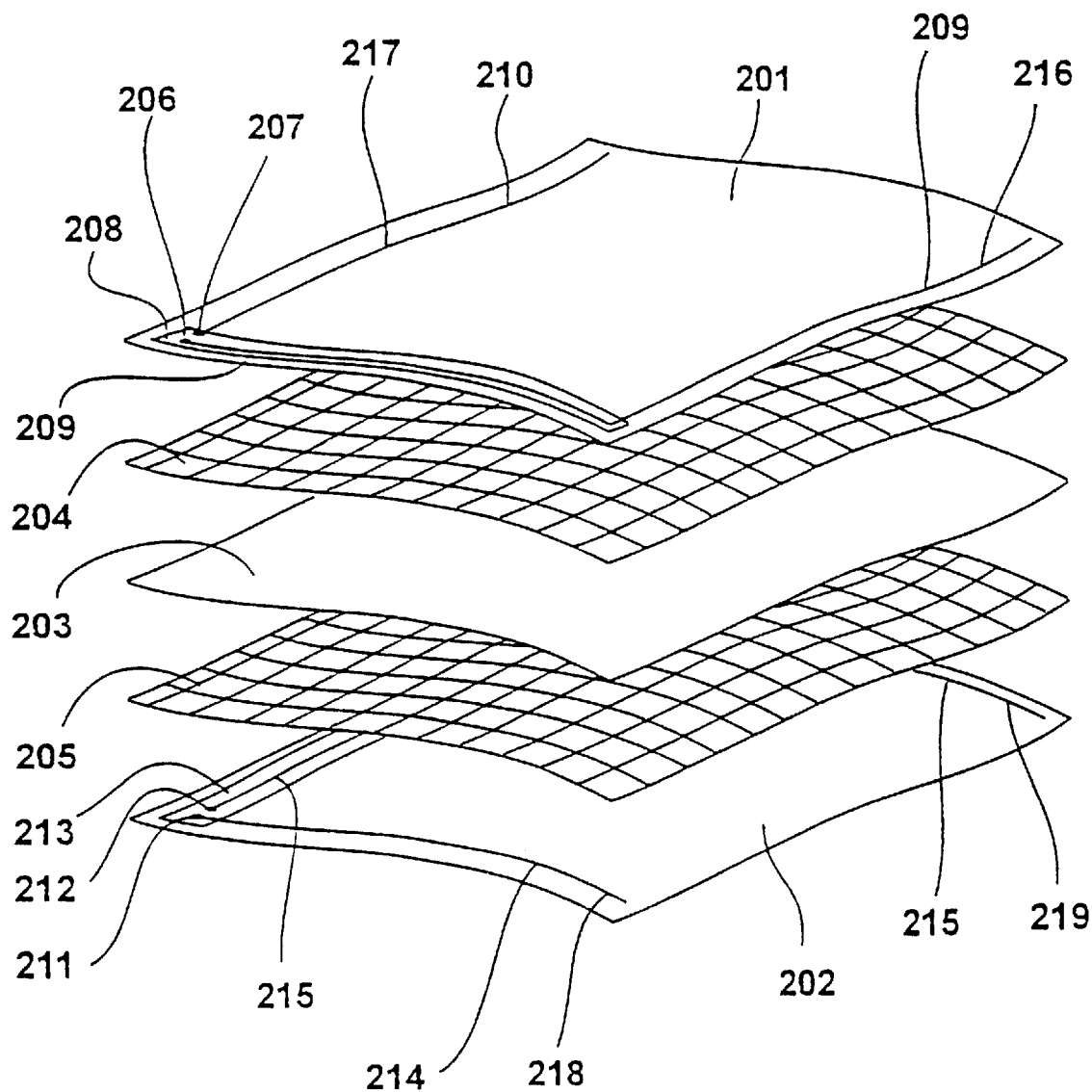
FIG. 2 details the sensor shown in FIG. 1.

An example of a sensor of the type shown in FIG. 1 is shown in the exploded view of FIG. 2. The sensor comprises two woven outer fabric layers 201 and 202, separated by a central layer 203. The central layer 203 is a layer of knitted fabric which may be made from conductive fibre only. Such fibre may, for example, be a carbon coated nylon fibre. However, preferably a yarn is used in the knit which is a mixture of insulating and conductive fibres and such a central layer is described later with respect to FIG. 9.

A first insulating mesh layer 204 is located between the upper fabric layer 201 and the central layer 203, and a second insulating mesh layer 205 is located between the lower fabric layer 202 and the central layer 203. The insulating mesh layers 204 and 205 are made from polyester fabric of a warp knit construction. Fabric of this type is readily available and may be used in applications such as mosquito nets.

Electrically conductive fibres are used when weaving layer 201 and 202, and so the layers 201 and 202 define two electrically conductive layers. Alternatively, the layers 201 and 202 may be constructed from non-woven (felted), or knitted fabrics or a composite structure. However, in each alternative case, electrically conductive fibres are included in the production of the fabric, thus providing electrically conductive layers.

Two electrical connectors 206 and 207 are located on a rectangular insulating stripe 208 that is positioned along one edge of fabric layer 201. The insulating stripe is produced by printing insulating ink onto the fabric but alternatively may be an insulating adhesive tape. The connectors 206 and 207 provide a means of connection from the interface circuit 203 to low resistance elements 209 and 210 respectively. The low resistance elements 209 and 210 are fabricated from fabric coated with metals such as nickel or silver. Material of this type is readily available and is used for shielding equipment from electromagnetic interference. The low resistance elements are attached to the conductive fabric layer 201 and the insulating stripe 208 by a conductive adhesive, such as a pressure sensitive acrylic adhesive containing metallised particles. Therefore, portions 216 and 217 of the low resistance elements 209 and 210 make electrical contact with the conductive fibres of layer 201 along two of its opposing edges. The conductive adhesive ensures a bond is formed between the low resistance elements 209 and 210 and the conductive fibres. Due to the bond, the resistance between the conductive fibres and the contacting portions 216 and 217 remains unaffected by folding or flexing the layer 201. This is important, as otherwise a 'dry joint' would exist connecting 216 and 217 to 201, and a varying resistance at the connections would lead to unreliable and, possibly, unstable measurements when the sensor is operated.

Alternatively, the low resistance elements 209 and 210 are formed by attaching, e.g. by sewing on, a low resistance fibre to the layer 201 and then printing a conductive adhesive or compound onto it and the layer 201. Alternatively the low resistance elements may be produced by printing an elastomeric material containing conductive particles onto the layer 201. All of the alternative described methods provide a suitable bond, forming a reliable electrical connection or 'wet joint'.

The lower fabric layer 202 has a similar construction to the upper fabric layer 201, having connectors 211 and 212 located on insulating stripe 213. The connectors 211 and 212 providing a means for connecting the interface circuit 103 with low resistance elements 214 and 215 respectively. The two layers 201 and 202 are rectangular and the construction of layer 202 is rotated ninety degrees from that of layer 201. Thus contacting portions 216 and 217 contact the conductive fibres in layer 201 along two opposing edges, and the low resistance elements 214 and 215 have contacting portions 218 and 219 which contact the conductive fibres in layer 202 along the alternate opposing edges.

Figure 3:
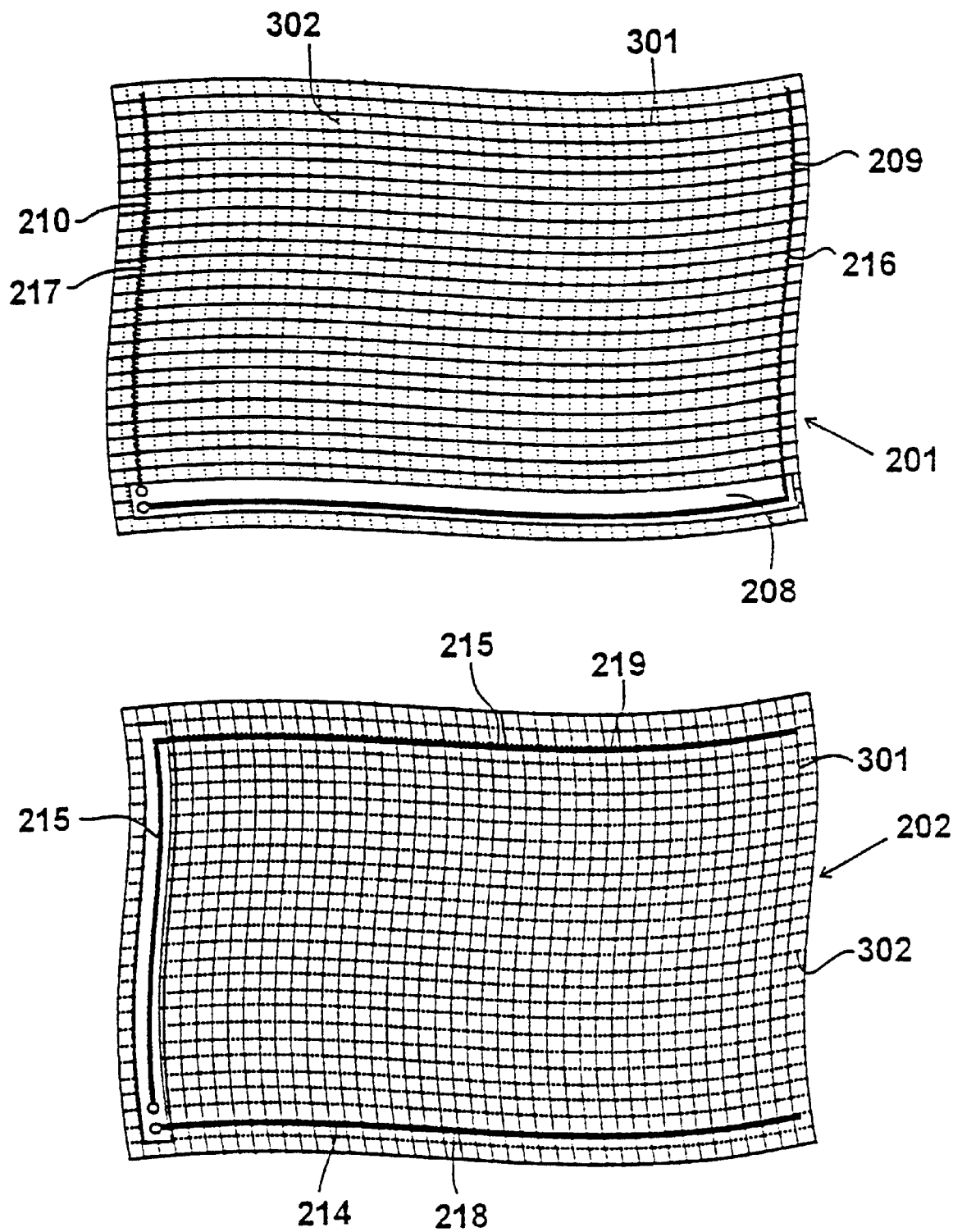
FIG. 3 illustrates upper and lower fabric layers of the sensor shown in FIG. 2.

The upper and lower fabric layers 201 and 202 are shown separately in FIG. 3. Fabric layers 201 and 202 are plain weaves having conductive fibres in both the warp and the weft directions and so are conductive in all directions along the respective layers. In FIG. 3, the warp fibres 301 of layer 201 are shown approximately horizontal and extend between the two contacting portions 216 and 217, while the weft fibres 302 are parallel to the contacting portions 216 and 217 and are shown approximately vertical. In layer 202, the warp fibres 301 are shown approximately vertical and extend between the contacting portions 218 and 219, while the weft fibres 302 are parallel to the contacting portions 218 and 219 and are shown approximately horizontal.

It is advantageous to the operation of the sensor, when current measurements are made, if the layers 201 and 202 have anisotropic conductivity. In particular it is advantageous if the layers 201 and 202 are more conductive in the directions parallel to their respective contacting portions. Thus, when the sensor is operated and a voltage gradient is applied between a pair of contacting portions, the respective layer is most conductive in a direction perpendicular to the voltage gradient and less conductive parallel to the voltage gradient. To achieve the desired anisotropic conductivity, the warp fibres are chosen to be of a higher resistance than the weft fibres. For this reason, the warp fibres 301 are 24 decitex carbon coated nylon 6 fibres sold by BASF and identified by the designation F901, such carbon coated fibres are commonly available and are used in electrostatic dissipation applications. The weft fibres are 16 decitex monofilament fibres, electrochemically coated with nickel and/or silver, sold under the trade mark "Xstatic" by Sauquoit Industries Inc., Pennsylvania, USA. Similar metallised fibres are commonly available and are normally used in electromagnetic interference shielding. Thus, a typical resistivity for a weft fibre is 500 ohms per centimeter, as opposed to approximately 200 Kohms per centimeter for the warp fibre. In layers 201 and 202 the fabric is woven with the same average spacing of 7.3 fibres per millimeter for both the weft and warp. Therefore, due to the different resistivity of the warp and weft fibres, the sheet resistivity of the layers in the directions parallel to the contacting portions is approximately 400 times less than the sheet resistivity in the perpendicular direction.

Figure 4:
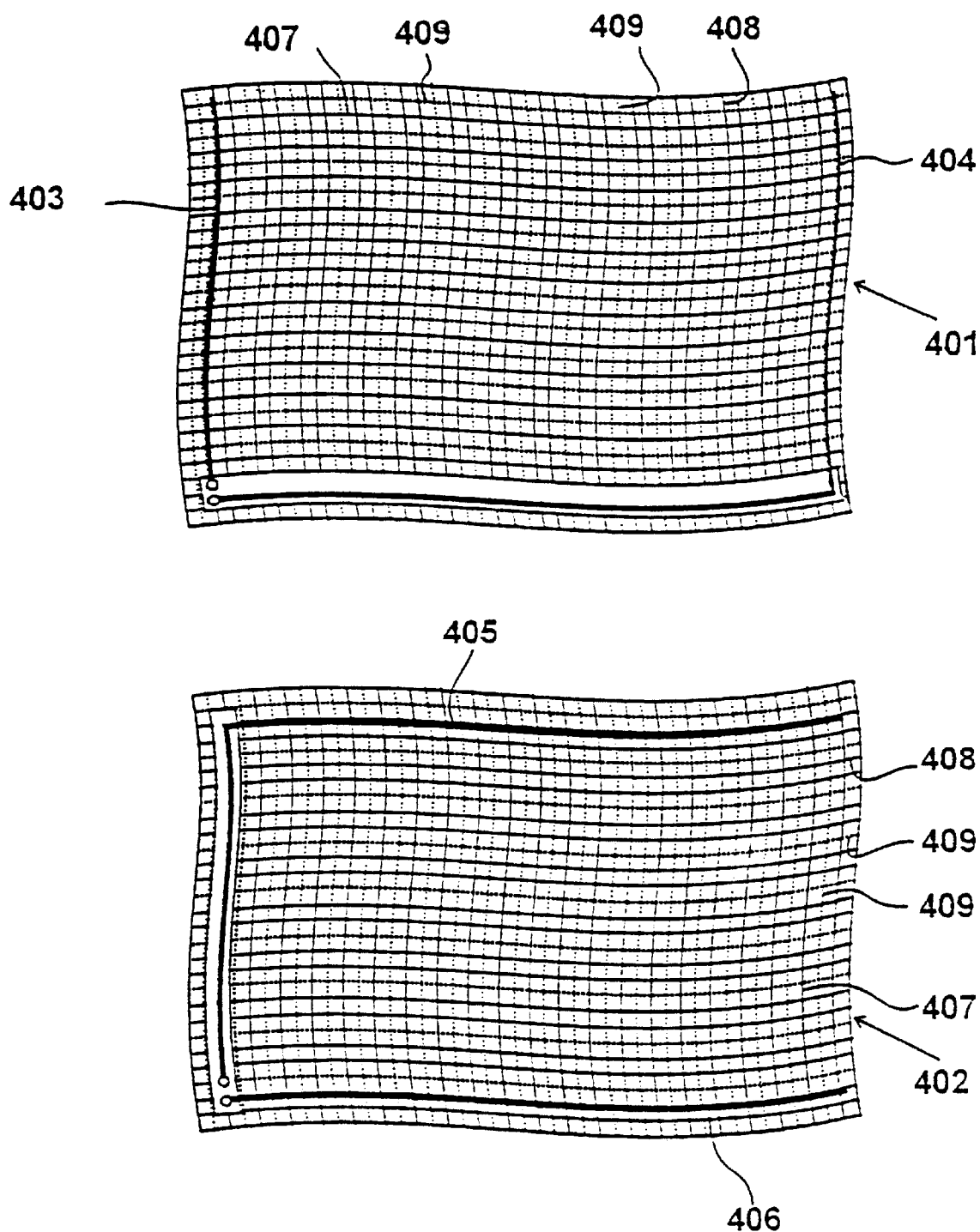
FIG. 4 shows an alternative embodiment of that shown in FIG. 3.

In an alternative embodiment the outer fabric layers 201 and 202 are replaced by outer fabric layers 401 and 402 respectively as shown in FIG. 4. The construction of layers 401 and 402 is similar to that of layers 201 and 202, except for the type of fibres used in the weft and warp. Thus, contacting portions 403 and 404 are located along opposing edges of layer 401 and contact conductive fibres within said layer, while contacting portions 405 and 406 are located along the alternate opposing edges of the layer 402 and make electrical contact with conductive fibres within layer 402.

Outer layer 401 includes conductive fibres 407 that conduct in the direction of the current flowing from contacting portion 403 to contacting portion 404. Cross threads 408 conduct in a direction perpendicular to this one, and have the effect of ensuring a linear voltage gradient across the sheet, even when the resistance of connections between lateral fibres 407 with the contacting portion 403 and 404 are variable, as would be expected in a manufacturing process. Insulating fibres 409 are used between adjacent parallel conductive fibres 407 in the warp direction and between adjacent parallel conducting fibres 408 in the weft direction. Anisotropic conductivity is achieved, in the present embodiment, by selecting a different ratio of conductive fibres 407 and 408 to non-conductive fibres 409 for each of the warp and weft directions. Thus, in the direction perpendicular to the contacting portions 403 and 404, which is horizontal in the drawing of layer 401 shown in FIG. 4, an insulating fibre alternates with a conducting fibre 402. There is an equal quantity of both. However, in the perpendicular direction, there are two conducting fibres 408 for each parallel insulating fibre 409. Thus, when the sensor is operated, in the direction perpendicular to applied current flow, or the direction perpendicular to the voltage gradient, conductivity is increased.

Outer fabric layer 402 has a similar structure to layer 401 but is rotated through ninety degrees. Therefore the weave includes weft fibres which are substantially parallel to contacting portions 405 and 406 and warp fibres which are perpendicular to contacting portions 405 and 406. The layer 402 is anisotropic in a similar manner to layer 401, since its weave contains two conductive fibres 408 for every insulating fibre 409 in the weft, while containing an equal number of conducting fibres 407 to insulating fibres 409 in the warp.

In the present embodiment, the conductive fibres 407 and 408 in both the weft and warp directions may be of equal resistivity since the anistropic conductivity of the layers is achieved by selection of the ratios of conductive fibres to insulating fibres. Therefore, a similar carbon coated nylon fibre may be used in both the weft and the warp directions of the weave.

Figure 5:
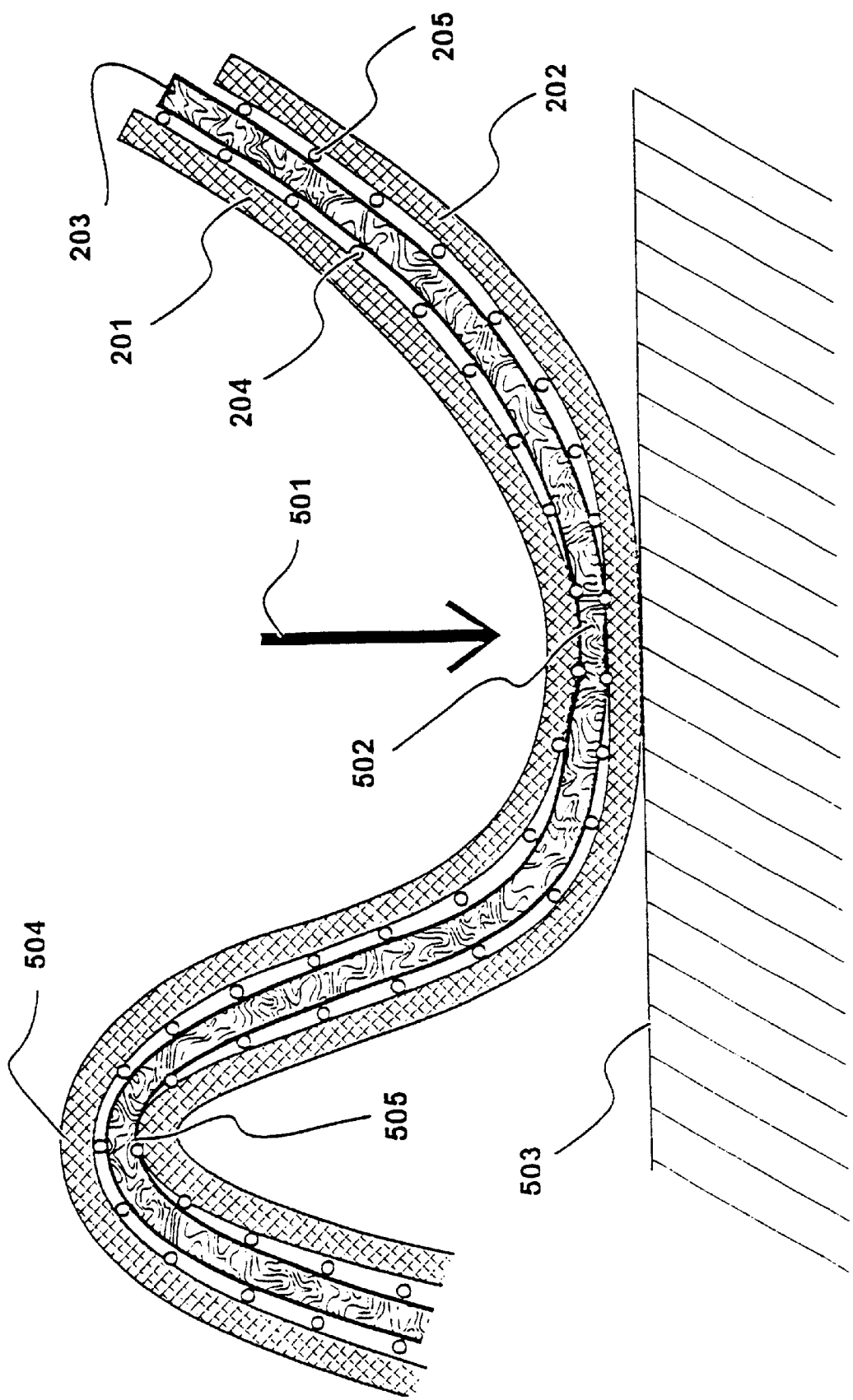
FIG. 5 shows a portion of the sensor shown in FIG. 2, in cross section.

A portion of the sensor shown in FIG. 2 is shown in the crosssectional view of FIG. 5. The spaces between the layers are shown exaggerated in this Figure, and the following Figures, in order to provide clarity. A force indicated by arrow 501 is pressing the sensor at position 502 against a solid surface 503. At position 502 the outer fabric layers 201 and 202 are pressed against the respective mesh layers 204 and 205. Also, due to the open structure of the mesh, the outer fabric layers are able to make contact with the central layer 203 through the apertures in the mesh and, moreover, the conductive fibres in the outer fabric layers make electrical contact with the conductive fibres included in the central layer. Thus, the conductive fibres in the central layer present a conducting means which provide a conductive path between the outer conductive fabric layers 201 and 202 at the position of the mechanical interaction.

In an alterative embodiment where the current measurement accuracy is not critical, costs savings are made by reducing the proportion of the conductive fibre to insulating fibre used in the outer layers, particularly by reducing the conductive fibre content in the direction parallel to the contacting portions.

The knitted central layer 203 has a compressible structure which becomes more conductive (less resistive) when it is compressed. This is due to loops in the conductive fibre coming increasingly into contact with other such loops as they are pressed together. As a result of this, the resistance between the outer layers at location 502 decreases as the force, indicated by arrow 501, increases. In addition, if the pressure applied to the sensor at location 502 is kept constant but the area over which it is applied is increased, then the resistance between the outer layers decreases, due to the increasing number of conducting fibres in the central layer coming into contact with the outer layers.

The sensor shown in FIG. 5 is folded at location 504 resulting in a tendency for one of the conducting layers to be brought into contact with the central layer. A property of many fabrics is that they may stretch in response to tensional forces but they may be compressed less easily in response to compressive forces. Consequently, rather than being compressed as such, fabrics tend to fold and bunch at positions where compressive force is being applied.

Certain constructions of fabric behave in the opposite way, being more easily compressed than stretched and in this case electrical contact at location 505 is made between the central layer 203 and the outer layer 201. In practice it is extremely rare for contact due to such compression and extension forces to occur simultaneously on both sides of the central layer at the location of a fold.

In the situation shown in FIG. 5, a fold has been created at position 504. In response to this fold, the outer circumferences of the fabric assembly will tend to be in tension and will therefore stretch, with the inner circumferences of the fabric assembly being in compression, resulting in bunching. This bunching will in turn cause radial force outwards, thereby tending to cause its outward circumferences to come into contact with inner circumferences of adjoining layers. Compression forces are therefore applied and hence bunching occurs towards the inside of a fold.

As shown in FIG. 5 conducting layer 202 has been brought into contact at location 505 with central layer 203 through insulating layers 205. As a result of this folding, electrical contact occurs where these two layers are brought into contact. However, a similar contact does not occur between central layer 203 and conductive layer 201. Consequently, although conduction occurs between conducting layer 202 and central layer 203, there is no similar conduction between central layer 203 and conductive layer 201 such that the presence of the fold does not result in spurious output signals.

Thus, the application of force, indicated by arrow 501, does result in all of the conductive layers being brought into contact such that current may flow between the layers to which voltage has been applied. However, when a sharp fold is introduced into the detector, as illustrated at 504, it is only possible for conduction to occur between two of the layers. Consequently, insulation still exists between the central layer and the other outer layer such that this is not interpreted as an application of force or similar mechanical interaction of interest.

In theory, it is possible for a fold to result in current being transmitted along the central layer 203 to an actual point of mechanical interaction. For this reason, it is preferable for the central layer 203 to have relatively low conductivity along the layer compared with conductivity across its thickness. This is further improved if the central layer 203 has a characteristic such that its conductivity significantly increases when the material is placed under pressure. Thus, a compressed portion at a position of a mechanical interaction will tend to have a relatively low resistance. This compares with the uncompressed central layer which will tend to have a much higher resistance. This, in combination with the relative length of the central layer between the position of a fold and the position of a mechanical interaction, will ensure that the degree of current being transmitted in this way is relatively small compared to the degree of current being transmitted at an actual mechanical interaction.

Figure 6:
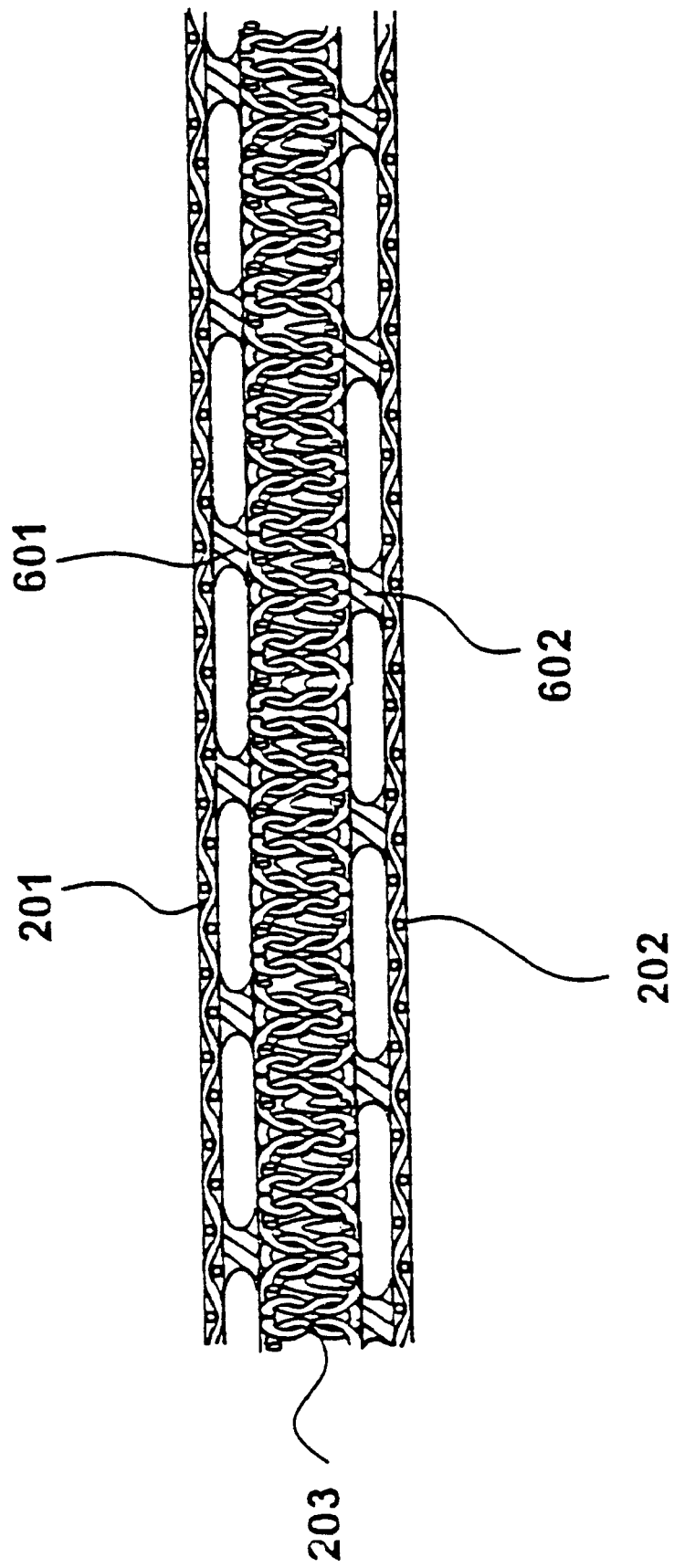
FIG. 6 shows a cross-sectional view of a preferred embodiment.

A portion of the position sensor of the preferred embodiment is shown in the cross-sectional view of FIG. 6. The outer fabric conducting layers 201 and 202 and the central layer 203 are of the same type as those described with reference to FIGS. 2 and 3. However, in this embodiment an array of insulating adhesive dots 601 provides the insulating separating means between the outer layer 201 and central layer 203, and a similar array of dots provides the insulating separating means between the outer layer 202 and central layer 203. The insulating adhesive is a polyurethane adhesive available from Penn Nyla, of Nottingham, Great Britain, but similar materials, of different qualities, are commonly available from a variety of manufacturers. Such adhesives are commonly used as continuous layer laminates, for waterproofing fabrics. The adhesive is applied by mixing with a solvent and printing the liquid solution. The adhesive is then heat cured after the layers are assembled.

The array of adhesive dots provide the same insulating function as the previously described mesh layers but also serve to attach the layers to their adjacent layer or layers. Thus, no further lamination process is required. Alternatively, the adhesive dots may be replaced by stripes of adhesive, or a network of lines of adhesive.

Figure 7:
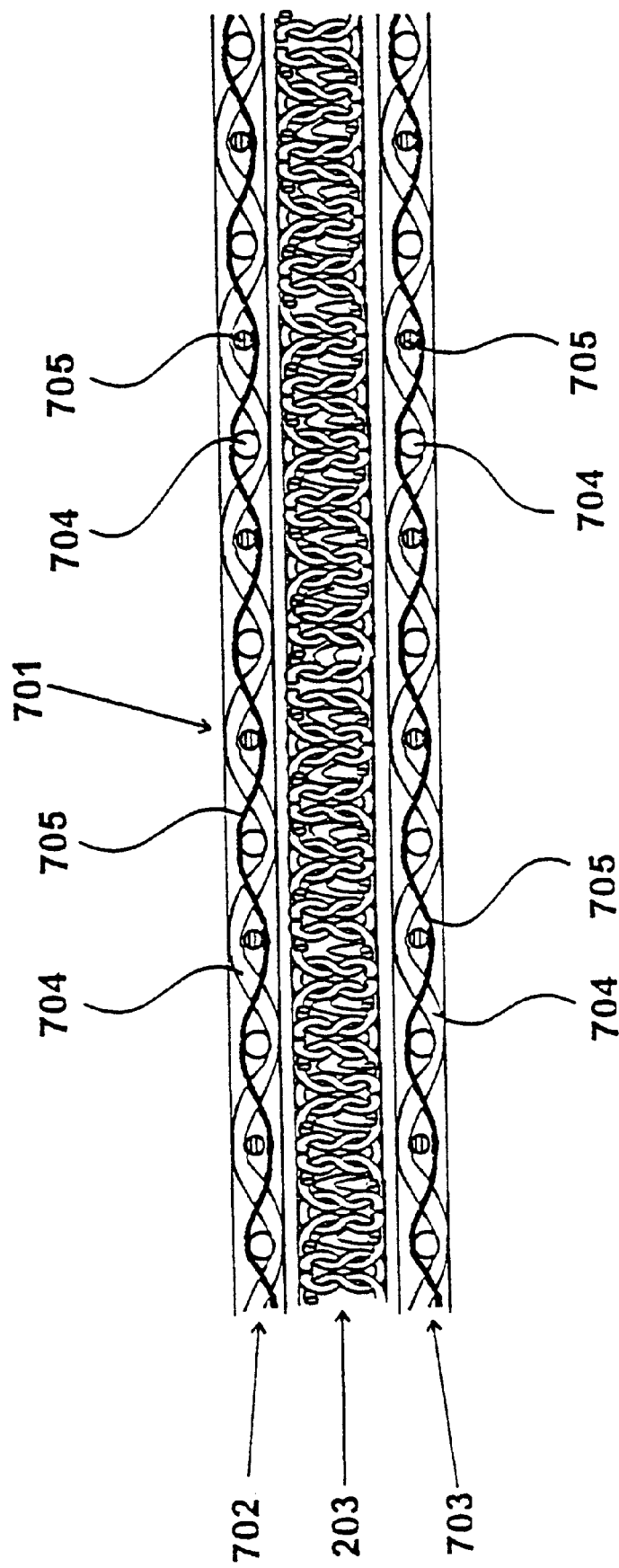
FIG. 7 shows a cross-sectional view of a first alternative embodiment.

A portion of an alternative position sensor 701 embodying the present invention is shown in the cross-sectional view of FIG. 7. The sensor has two outer layers 702 and 703 separated by a central layer 203 of the type previously described with reference to FIG. 2. The outer layers 702 and 703 are woven using alternating strands of insulating yarn 704 and conductive fibre 705 in both the warp and the weft. The nonconducting yarn 704 is of a larger diameter than that of the conductive fibre 705 and so the conductive fibre is recessed below the general surface of the layers 702 and 703. The recessing of the conductive fibre 705 is further enhanced by using a single filament fibre of carbon coated nylon 6, while the insulating yarn is made by twisting together a bundle of fine insulating fibres of polyester, each of which is of a thinner diameter than the conductive fibre. The conductive fibre is therefore considerably less compressible and flexible than the insulating yarn and so it tends to remain straighter than the insulating yarn in the woven fabric.

The conductive fibre 705 in the warp and the weft of the layer 702 thus forms a conductive layer which allows conduction in all directions along the layer 702. The conductive layer so formed, is recessed from the conductive fibre in the central layer by means of the insulating yarn 704. The conductive layer becomes exposed at the surfaces of the layer upon application of pressure. The insulating yarn therefore provides an insulating separating means between the conductive layer within layer 702 and the conducting fibre in the central layer. Similarly the conductive fibre 705 within layer 703 also forms a conductive layer which allows conduction in all directions along the layer, and the insulating yarn 704 provides an insulating separating means between said conductive layer and the conductive fibres within the central layer.

Under the pressure of an applied external force, the conductive fibres of the outer layers are brought into contact with the conductive fibre of the central layer and so the conductive fibre within the central layer provides a conductive path between the two outer conducting layers. However, at other locations, for example at a fold, the insulating yarn performs the function of the mesh layers of FIG. 5, and prevents a conductive path being formed.

In an alternative embodiment the insulating yarn may be replaced with a single filament insulating fibre of larger diameter than that of the conducting fibre 705. The conducting fibre is then recessed within the layers 702 and 703 due to its smaller diameter.

Figure 8A:
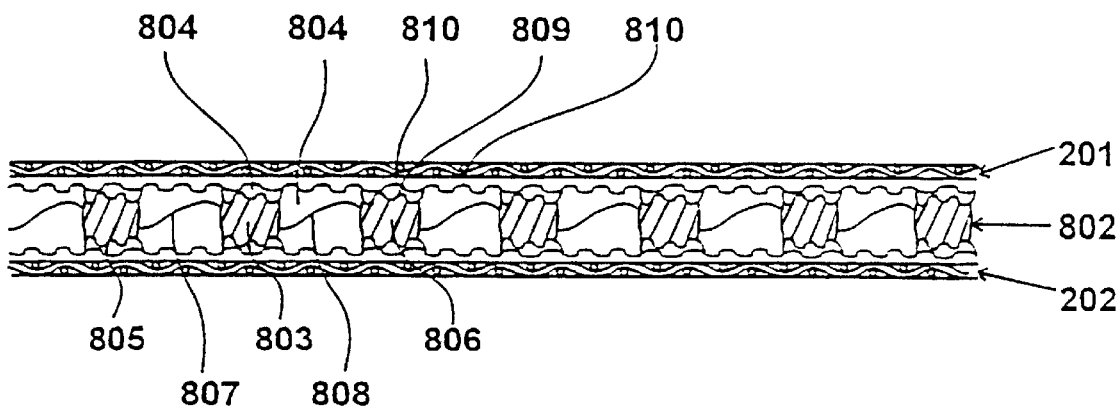
FIGS. 8A and 8B show a cross-sectional view of a second alternative embodiment.

A portion of a further alternative position sensor 801 is shown in the cross-sectional view of FIG. 8A. The sensor 801 has outer conductive fabric layers 201 and 202 of the type described with reference to FIGS. 2 and 3. However, the outer layers are separated by a central layer 802 which is knitted according to a pattern using a multi-filament insulating yarn and separate conducting fibre, with the pattern arranged such that the conducting fibre is concentrated into conductive islands 803 surrounded by a fabric constructed mainly from insulating yarn. Each conductive island is therefore surrounded by a very high resistance fabric portion 804. The operation of the sensor is optimised if the fabric 804 is completely non-conductive. However, in order that continuous lengths of conductive fibre may be used in the knitting production process without cutting the conductive fibre, each island is connected to two neighbouring islands by a continuous conducting fibre. For example, island 803 is connected to islands 805 and 806 by portions of conductive fibre 807 and 808 respectively. The knitted fabric is configured such that the connecting portions of conductive fibre, such as 807, are recessed within non-conducting fabric.

The knitted central layer 802 is also configured such that the conductive islands are recessed below the general surface of the high resistance fabric portion 804. For example, the conducting fibre of conductive island 806 defines an upper surface 809 which is below the general upper surface 810 of the surrounding high resistance fabric portion 804. The recessing of the conductive fibre is achieved by applying greater tension to it during the knitting process.

Figure 8B:
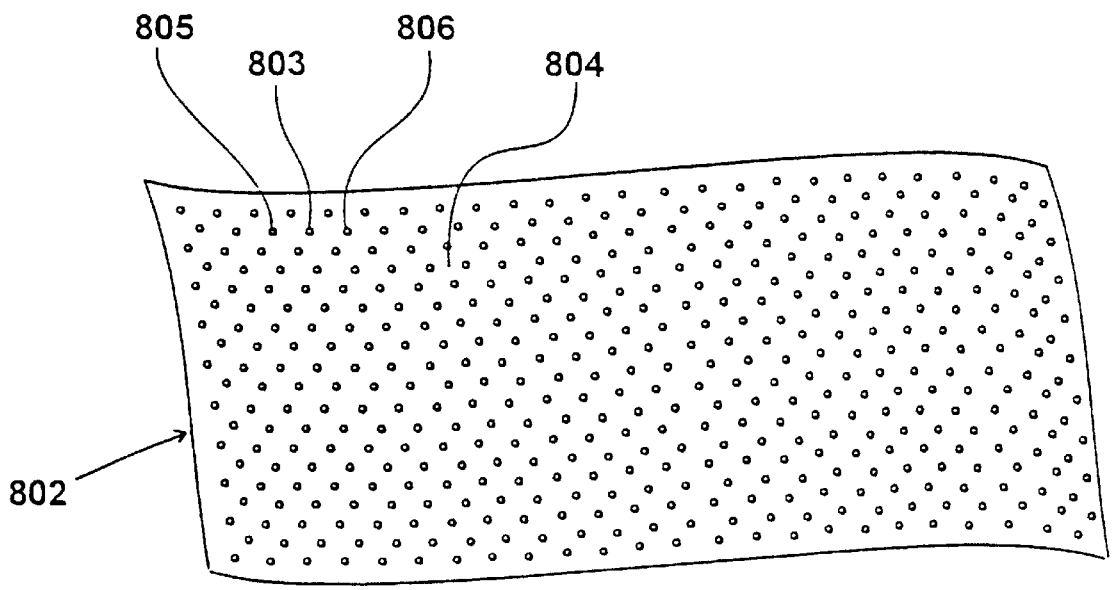

A view of the upper surface of the central layer 802 is shown in FIG. 8B. As is shown, each of the conductive islands, such as 803, 805 and 806, are surrounded by the substantially non-conductive fabric 804. Thus, conductivity in the central layer 802 is minimised in all directions along the layer.

In operation the sensor 801 performs in a similar manner to those previously described. At the position of an external applied force the conductive outer layers 201 and 202 are pressed into electrical contact with conductive fibres in a number of the conductive islands. The conductive fibres in the central layer, therefore provide a conductive path between the outer conductive layers at the position of a mechanical interaction.

At other locations, such as at folds in the fabric, the insulating yarn within the high resistance fabric portion 804 prevents both of the outer layers from coming into contact simultaneously with the conductive fibre of the central layer at a particular location. The insulating yarn within the central layer thus provides an insulating separating means disposed between each of the outer conductive layers and the conducting means within the central layer. This forms a fabric considerably more conductive across its thickness than along the layer, thus reducing still further any interference, with positional data from a mechanical interaction, caused by contact between the central layer and one outer layer due to folding at a nearby position.

Figure 9A:
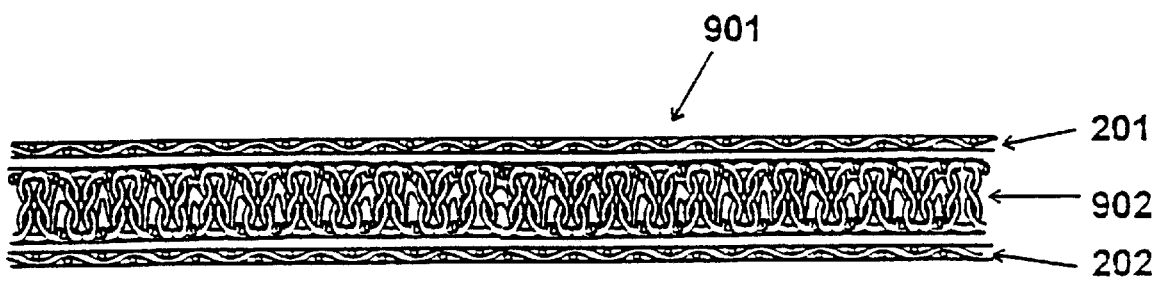
FIGS. 9A, 9B and 9C show a cross-sectional view of a third alternative embodiment.

A portion of a further alternative position sensor 901 is shown in cross-section FIG. 9A. The sensor 901 comprises outer conducting layers 201 and 202 of the type described with reference to FIGS. 2 and 3 separated by a knitted fabric central layer 902. The central layer 902 is knitted using a yarn constructed by twisting together a conductive fibre and a plurality of insulating fibres. The fibres are chosen so that the conductive fibre is recessed below the general profile of the surface of the yarn.

Figure 9B:
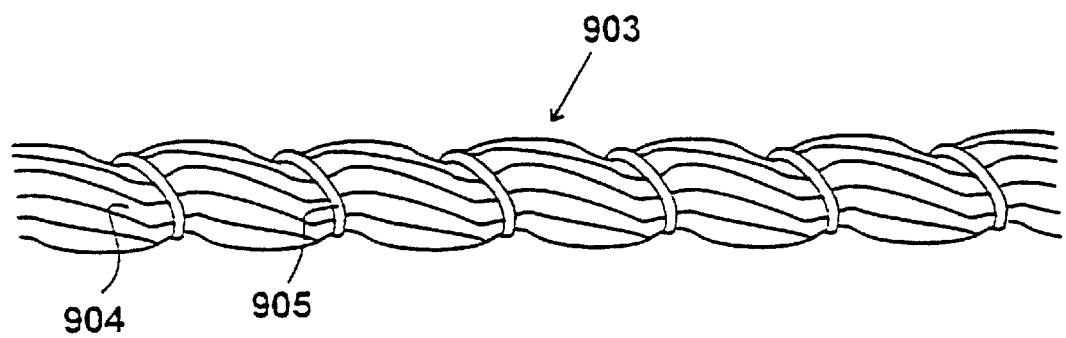

A portion of the mixed fibre yarn 903 used to produce the central layer 902 is shown in FIG. 9B. The yarn 903 is produced on conventional equipment by twisting together a bundle of mono-filament polyester fibres 904 with a single filament carbon coated nylon fibre 905. During manufacture of the yarn 903 the conducting fibre 905 is twisted under more tension than the insulating fibres 904 and as a result the conducting fibre is recessed below the general profile of the insulating fibres. The recessing process is further assisted by selecting a conducting fibre of slightly larger diameter and hence greater stiffness than the individual insulating fibres.

Therefore, by using yarn 903 to produce the central layer 902, the insulating fibres 904 prevent the conducting fibre 905 from coming into contact with the conducting outer layers 201 and 202 except at locations where pressure is applied. In addition, the portions of insulating fibres 904 within the structure of the central layer 902, tend to hold the conductive fibres apart. However, when an external force is applied to the sensor, the central layer becomes compressed at the location of the applied force and portions of conducting fibre come increasingly into contact with each other. As a result, the resistance between the outer layers, through the central layer, decreases as the applied force increases.

Figure 9C:
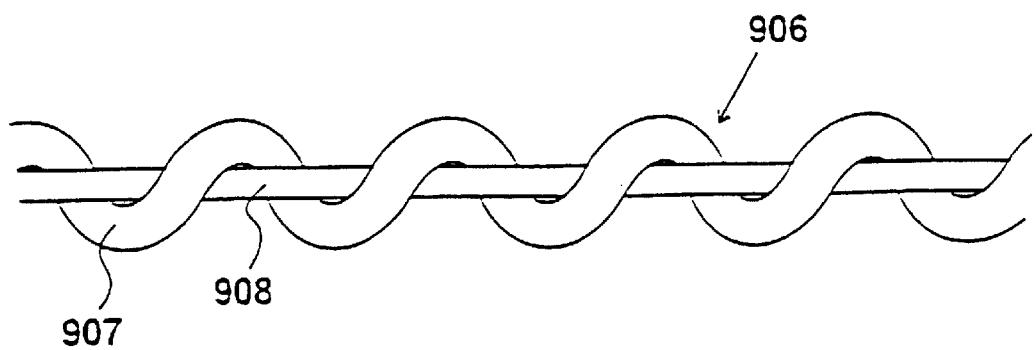

A portion of a mixed fibre yarn 906 which has an alternative construction to the yarn of FIG. 9B is shown in FIG. 9C. The yarn 906 is manufactured on conventional equipment by twisting together a bundle of fine, flexible insulating fibres 907 with a single, less flexible conducting fibre 908. In this example, yarn 906 includes ten 16 decitex mono-filament polyester fibres 907 and one 24 decitex mono-filament carbon coated nylon 6 fibre. Due to the relatively large diameter, and hence the relative rigidity of the conductive fibre 908, the insulating fibres become wrapped around the conducting fibre. The conductive fibre is, thus, recessed below the general profile of the surface of the yarn.

Figure 10:
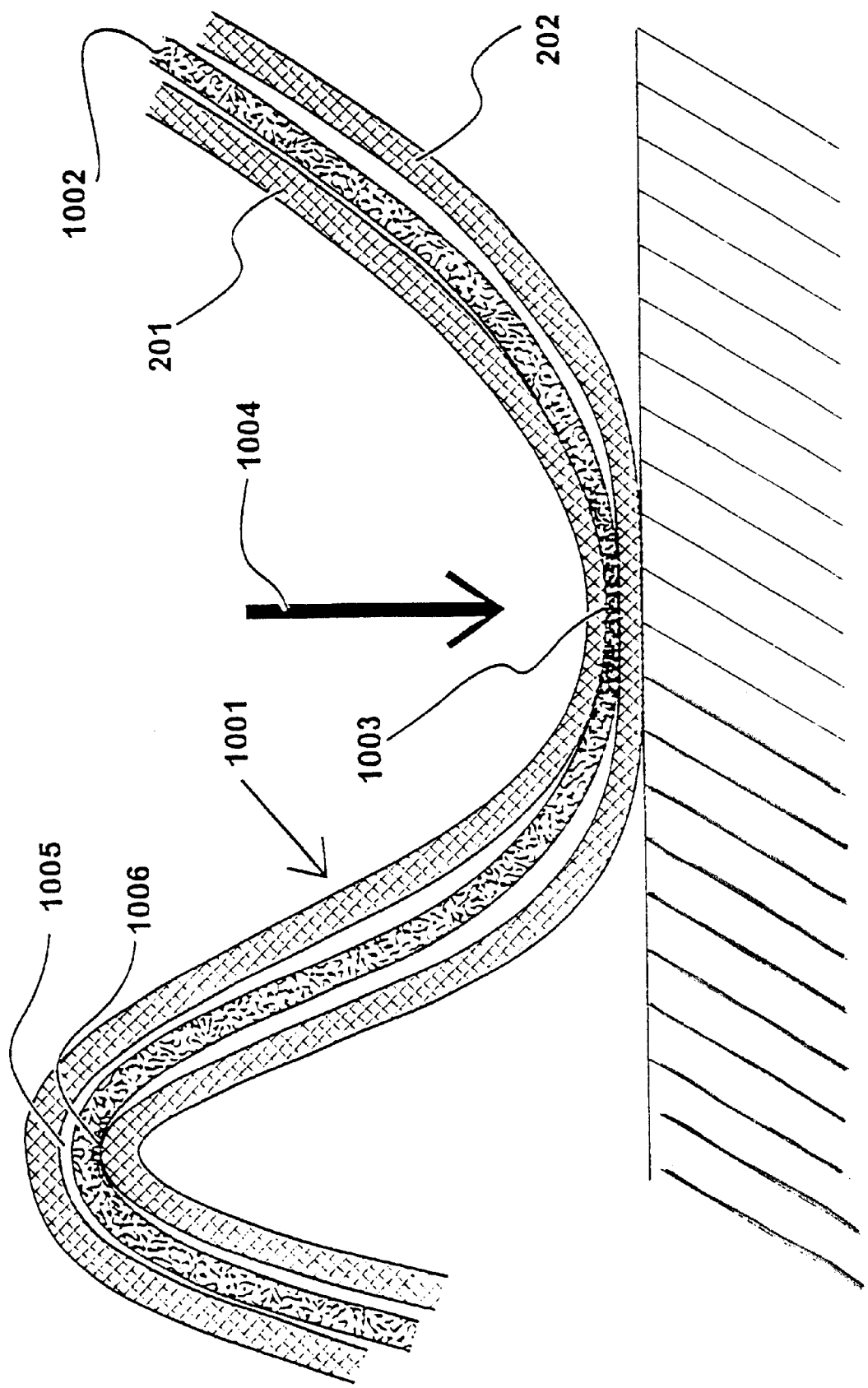
FIG. 10 shows a cross-sectional view of a fourth alternative embodiment.

A portion of a further alternative position sensor 1001 is shown in cross-section in FIG. 10. A central layer 1002 separates the outer layers 201 and 202, which are of the type described with respect to FIGS. 2 and 3. The central layer is a felted (non-woven) fabric comprising of a mixture of conductive and insulating fibres. The conductive fibres are manufactured to be shorter than the thickness of the central layer and therefore none of the conductive fibres extend completely through the central layer. Furthermore, the ratio of conductive to non-conductive fibres is such that there is no conductive path through the thickness of central layer, or along the central layer, when it is not compressed. Therefore, at locations where no external force is applied to the sensor and the central layer is not compressed, some conductive fibres in the central layer may be in contact with the outer layer but no conductive path exists between the outer layers.

At location 1003, the sensor is compressed by an externally applied force indicated by arrow 1004. The force brings the three layers into intimate contact and conductive fibres in the central layer make electrical contact with the outer conductive layers. In addition, the conductive fibres within the central layer come into contact with other such fibres and thus a conductive path is formed though the central layer between the two outer layers. Furthermore, as the force is increased, the layer is further compressed, the conductive fibres make further connections with other such fibres and the resistance between the outer layers is decreased.

At location 1005 the sensor is folded and produces a localised region of conductivity within the central layer close to its inner surface 1006. However, the region of conductivity does not extend through the layer 1002 and so a conductive path is not formed.

This configuration provides a position sensor for detecting the position of an applied mechanical interaction where the mechanical interaction has an area and a force. The arrangement includes a first fabric layer 201 having conductive fibres machined therein to provide a first conductive outer layer. In addition, there is provided a second fabric layer 202 having conductive fibres machined therein to provide a second conductive outer layer. A single inner layer 1002 is provided disposed between the first fabric layer and the second fabric layer. The inner layer comprises a plurality of conductive fibres or particles such that a conductive path is provided through the fibres or particles when the insulating material is placed in compression.

Figure 11:
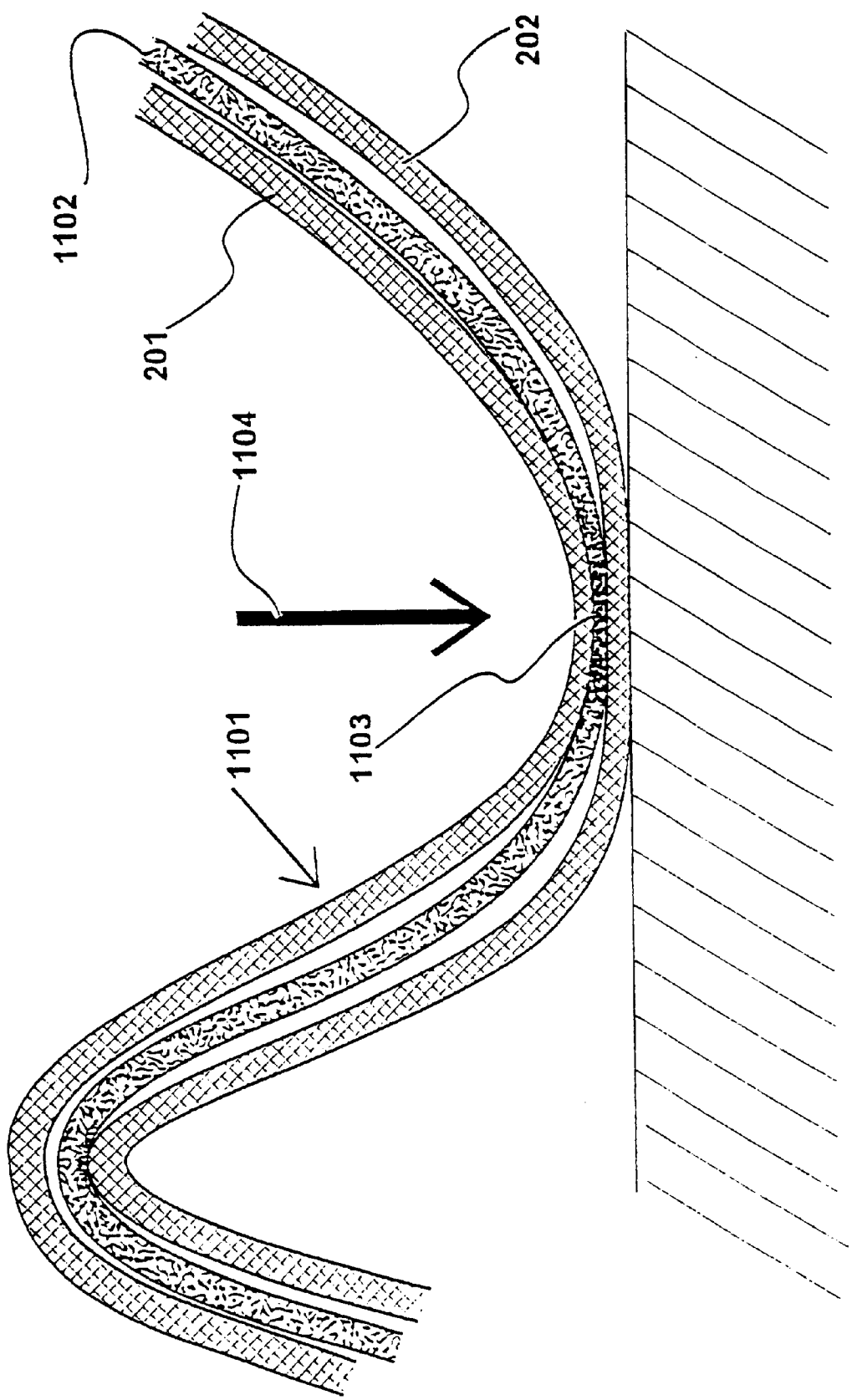
FIG. 11 shows a cross-sectional view of a further preferred embodiment.

A portion of a further alternative position sensor 1101 is shown in cross-section in FIG. 11. A central layer 1102 separates the outer layers 201 and 202, which are of the type described with respect to FIGS. 2 and 3. The central layer 1102 consists of conductive filaments interspersed within a compressible elastomeric compound. In the present embodiment the elastomeric compound is a silicone rubber compound. The conductive filaments are sufficiently short such that they cannot extend across the thickness of the layer and the density of the filaments within the silicone compound is such that they generally do not connect with each other. However, when the layer is compressed the fibres within the central layer increasingly come into contact with other such fibres and form a localised conductive region. Therefore at position 1103 an applied force indicated by arrow 1104 compresses the layers 201, 202 and 1102 and the conductive fibres within the central layer 1102 provide a conductive path between the outer conductive layers.

The sensitivity of sensors such as sensor 1101 is determined by the density of fibres within the silicone compound and the compressibility of the silicone compound.

In an alternative embodiment the short filaments within central layer 1102 are replaced by conductive particles such as nickel powder.

Figure 12:
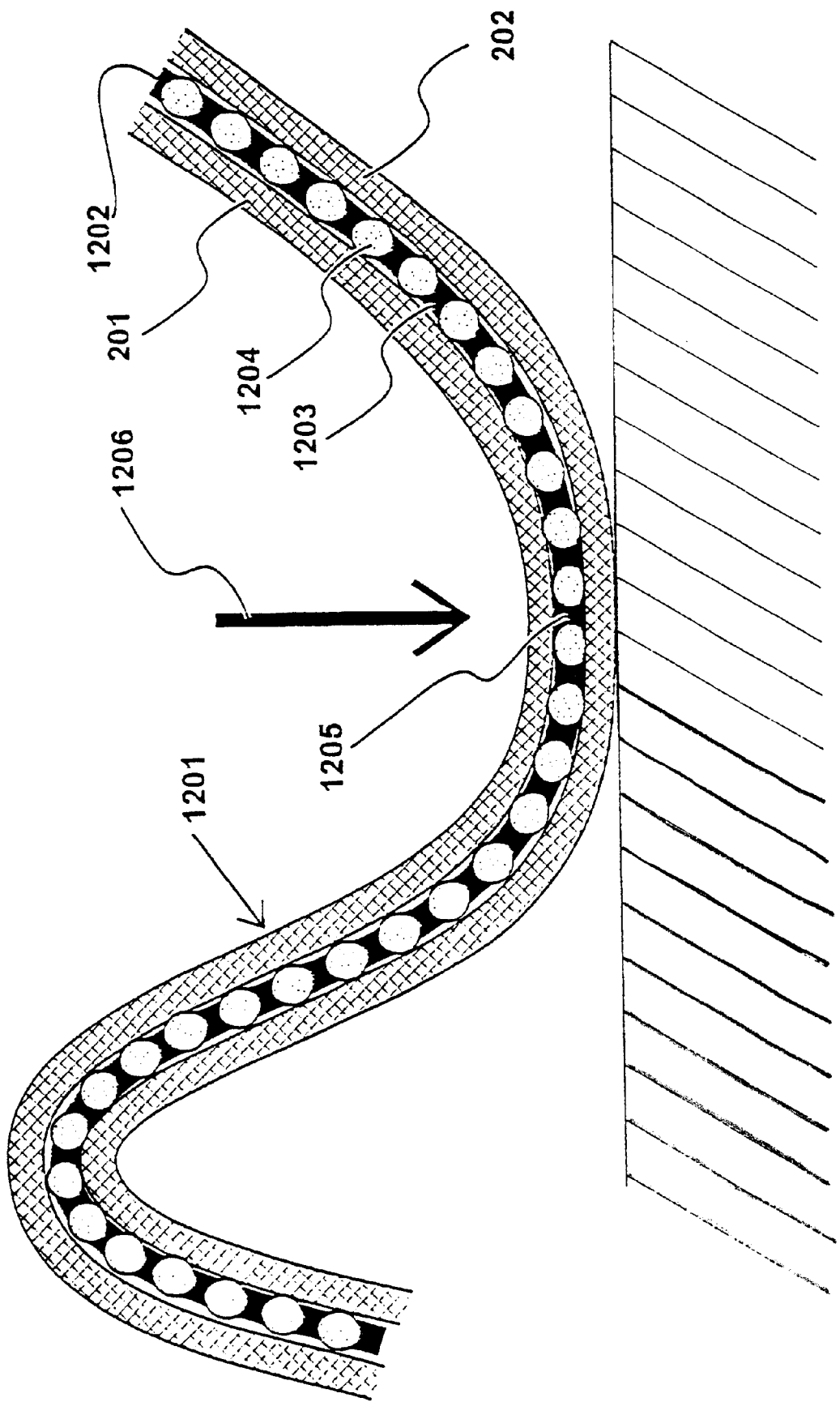
FIG. 12 shows a cross-sectional view of a further alternative embodiment

A portion of a further alternative position sensor 1201 is shown in cross-section in FIG. 12. A central layer 1202 separates the outer layers 201 and 202, which are of the type described with respect to FIGS. 2 and 3. Central layer 1202 is constructed from fabric (but alternatively it may be another deformable material) and has recessed electrically conductive elements 1203 continuing through the thickness of the layer 1202, together with a raised non-conductive element 1204. Therefore, at locations where no external forces are applied, the raised non-conductive element 1204 provides an insulating separating means between each of the outer layers and the conductive elements 1203. Conductive elements 1203 are electrically isolated from each other by the non-conductive element 1204 and thus layer 1202 is not conductive along the layer in any direction. The non-conductive element 1204 is formed from fabric having open spaces corresponding to conductive elements 1203 with printed conductive material such as elastomeric conductive polymer forming the conductive elements 1203. The conductive material is chosen in this case to be relatively incompressible and it therefore has a resistivity which is relatively stable under varying applied pressure.

At position 1205 the sensor is compressed by an externally applied force indicated by arrow 1206. A number of the conductive elements are brought into contact with both of the outer layers and so provide a conductive path between the outer layers. An increase in the applied force produces only a relatively small change in the resistance between the two outer layers because of the incompressible nature of the conductive elements. However, as the area over which the force acts increases, the number of conductive elements that provide a conductive path between the outer layers also increases. Therefore, the resistance between the outer layers decreases as the area of mechanical interaction increases but it is relatively unaffected by changes in force.

Figure 13:
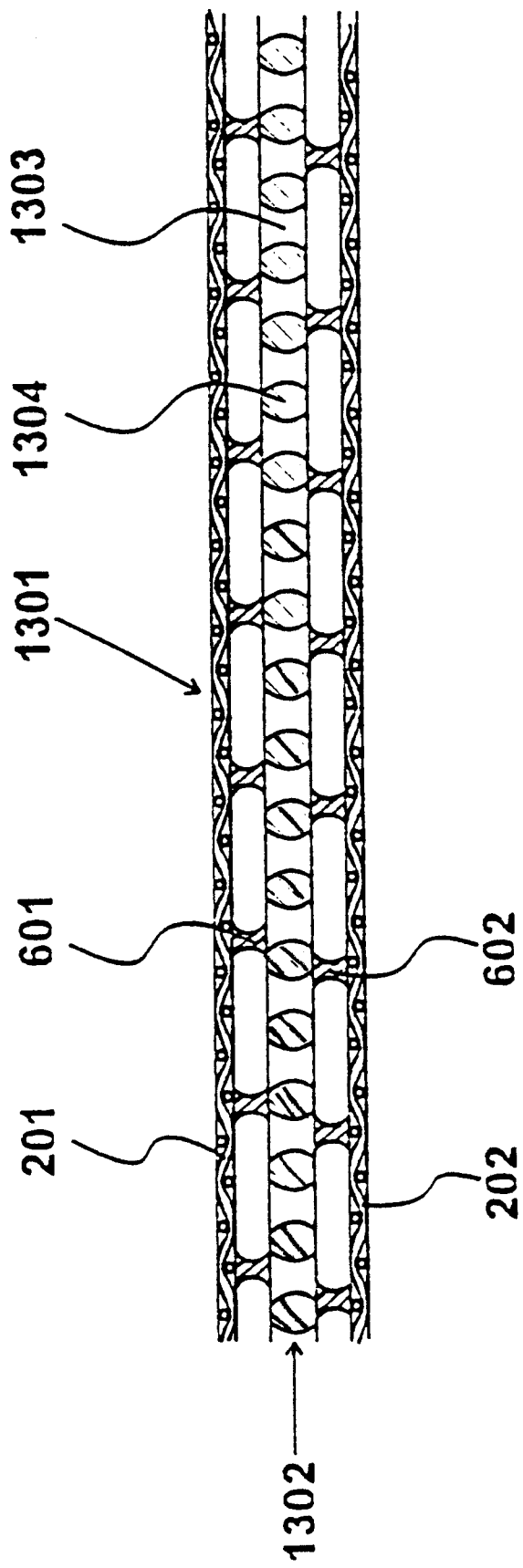
FIG. 13 shows a cross-sectional view of a further alternative embodiment.

A further alternative embodiment of the present invention is shown in cross-section in FIG. 13. A sensor 1301 comprises outer layer 201 and 202 of the type described with reference to FIGS. 2 and 3, separated by a central fabric layer 1302. The conductive outer layers 201 and 202 are attached by arrays of electrically non-conducting adhesive dots 601 and 602 to the central layer 1302. The adhesive dots 601 and 602 are of the type previously described with reference to FIG. 6. The central layer is manufactured by printing an electrically conductive printable material, such as a conductive ink, onto insulating fabric 1303 having an open weave structure, to produce an array of dots. (Alternatively a knitted fabric, or a non-woven fabric may be used in place of the open structured weave.) The ink soaks through the thickness of the fabric 1303 to produce an array of conductive islands 1304 that provide a conductive path through the thickness of fabric layer 1302. The pattern and spacing of the dots 601 and 602 is chosen to be different from the pattern and spacing of the conductive islands 1304 and so potential problems with Moire effect interference and synchronised overlapping are avoided. Typically, the insulating dots 601 and 602 have a spacing of three millimeters whereas the conducting islands have a spacing of 1.3 millimeters.

Therefore, the sensor 1301, like the previously described sensors, has a structure which allows it to be folded without producing a conductive path between the outer conductive layers at the fold, while at the same time allowing a suitably small externally applied force to bring the outer layers into contact with the central layer, which then provides a conductive path between the outer two layers.

Figure 14:
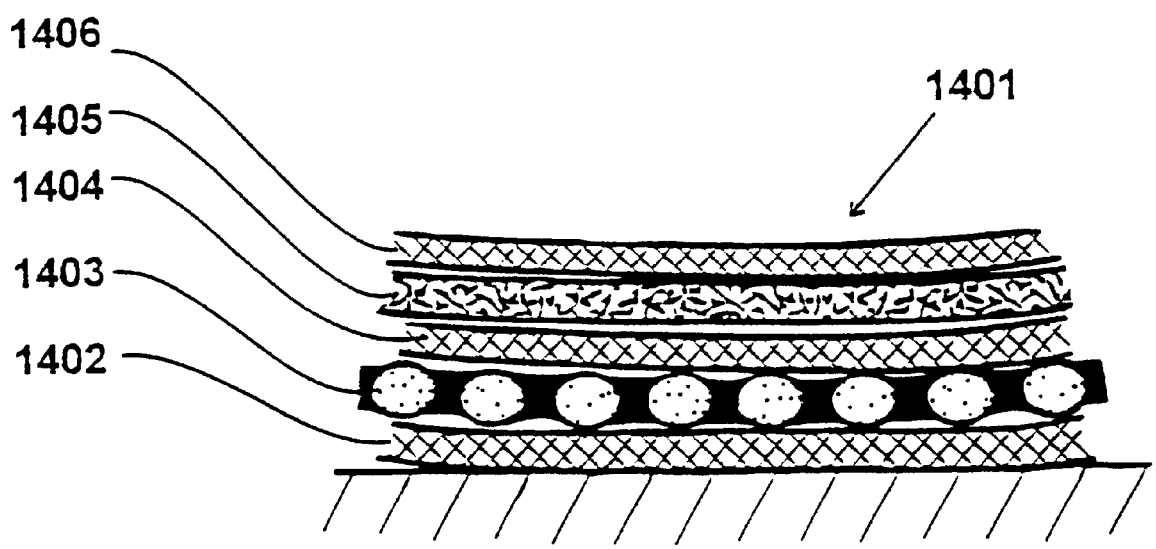
FIG. 14 shows a detector for detecting force and area separately.

A sensor 1401 for detecting force and area separately is illustrated in FIG. 14. The sensor 1401 has a multi-layer construction. In effect, two sensors are combined. A first, comprising the arrangement shown in FIG. 12 using substantially incompressible elements 1203, and a second utilising the highly compressible central layer indicated in FIG. 11. Thus layers 1402 and 1406 are constructed in accordance with fabric layer 201, layer 1404 is constructed in accordance with fabric layer 202, layer 1403 is similar to layer 1202 and layer 1405 is similar to layer 1102. When pressure is applied to the sensor, a lower outer plane 1402 makes physical contact with a first inner layer 1403. The first inner layer 1403 makes physical contact with a layer 1404. A substantially compressible layer 1405 forms the next layer, and an outer layer 1406 forms the final stage of the construction. Electrical signals may be applied to layers 1402, 1404 and 1406, in order to detect the effect of mechanical interactions with the partially conductive layers 1403 and 1405. Layers 1402, 1404 and 1406 are of a similar construction to layers 201 and 202, and they are orientated such that the contacting portions on layer 1406 are parallel to those of layer 1402 and perpendicular to those of layer 1404. Using this construction, the characteristics of the two detectors are combined. From a first set of measurements, in respect of layers 1402, 1403 and 1404, an area of applied pressure may be determined. A second set of measurements, in respect of layers 1404, 1405 and 1406, determines a value related to the product of force and area. (The two sets of measurements are similar to those made for the previously described detectors and are described below.) The applied force may then be determined by dividing a second reading by a first reading. Readings related to force and area are thereby obtained independently, thus also allowing a calculation for pressure, being force divided by area, to be made along with x and y co-ordinates obtained as described below with respect to FIGS. 15A–D, 16–20.

A procedure for measuring the position of a force applied to a position sensor of the types described above and a second characteristic of that force is illustrated by FIGS. 15A, 15B, 15C and 15D. The outer conductive layers of the same type as layers 201 and 202 are represented schematically by potentiometers 1501 and 1502 and the resistance of the conductive path between the outer layers at the location of the applied force is represented by variable resistor 1503.

A first measurement is shown in FIG. 15A. Five volts are applied to connector 211, while connector 212 remains disconnected. Connector 207 is connected to ground via a resistor 1504 of known value. Thus current flows from connector 211 through a first part of layer 202 indicated by a first part 1505 of potentiometer 1502, through the conductive path indicated by variable resistor 1503 having resistance Rv, through a first part of layer 201, indicated by a first part 1506 of potentiometer 1501 and through the known resistor 1504. The voltage, V1 appearing at connector 207 is measured and since this is equal to the voltage drop across resistor 1504, V1 is directly proportional to the current flowing from connector 211.

A second measurement is shown in FIG. 15B. Five volts are applied to connector 206, while connector 207 is disconnected. Connector 212 is connected to ground via a resistor 1507 of known resistance. The voltage V2, dropped across resistor 1507 is measured. Voltage V2 is directly proportional to the current flowing through a second part of layer 201 indicated by a second part 1508 of potentiometer 1501, through the conductive path indicated by variable resistor 1503 having resistance Rv, through a second part of layer 202 indicated by a second part 1509 of potentiometer 1502 and through resistor 1507.

The sum of the resistance of first part 1506 and second part 1508 of potentiometer 1501 is approximately equal to the resistance between connector 206 and 207 on layer 201, and is therefore substantially constant during the measurements, since they occur in rapid succession. Similarly the sum of the resistance of first part 1505 and second part 1509 of potentiometer 1502 is approximately equal to the resistance between connector 211 and 212 on layer 202, and is also substantially constant during the measurements. As a result, the relationship 1510 exists between the resistance Rv, of the conductive path between the outer layers, and the measured voltages V1 and V2. i.e. the resistance Rv between the outer layers is proportional to the sum of the reciprocal of voltage V1 and the reciprocal of voltage V2.

Depending upon the type of sensor used the resistance Rv depends upon area of the applied pressure or a function of the area and the force as illustrated by relationship 1511. Thus from the voltage measurements V1 and V2 an indication of the area over which the force is applied, or an indication of the area and the applied force may be determined.

A third measurement is shown in FIG. 15C. Five volts is applied to connector 212 while connector 211 is grounded, and so a potential gradient is produced across layer 202. A voltage measurement is made at connector 207 using a high impedance device and so the voltage appearing on layer 202 at the position of the applied force is determined. This voltage, V3 is directly proportional to the distance of the centre of the applied force from contacting portion 218 and indicates its x axis position.

A fourth measurement is shown in FIG. 15D. Five volts are applied to connector 207 and connector 206 is grounded. A voltage measurement is made of voltage V4 appearing at connector 212. Voltage V4 is directly proportional to the distance of the centre of the applied force from contacting portion 216 and indicates its Y axis position. Therefore voltage V3 and V4 provide information as to the two dimensional position of the applied force on the sensor. i.e. voltages V3 and V4 represent X and Y values for the centre of the position of the applied force.

Figure 16:
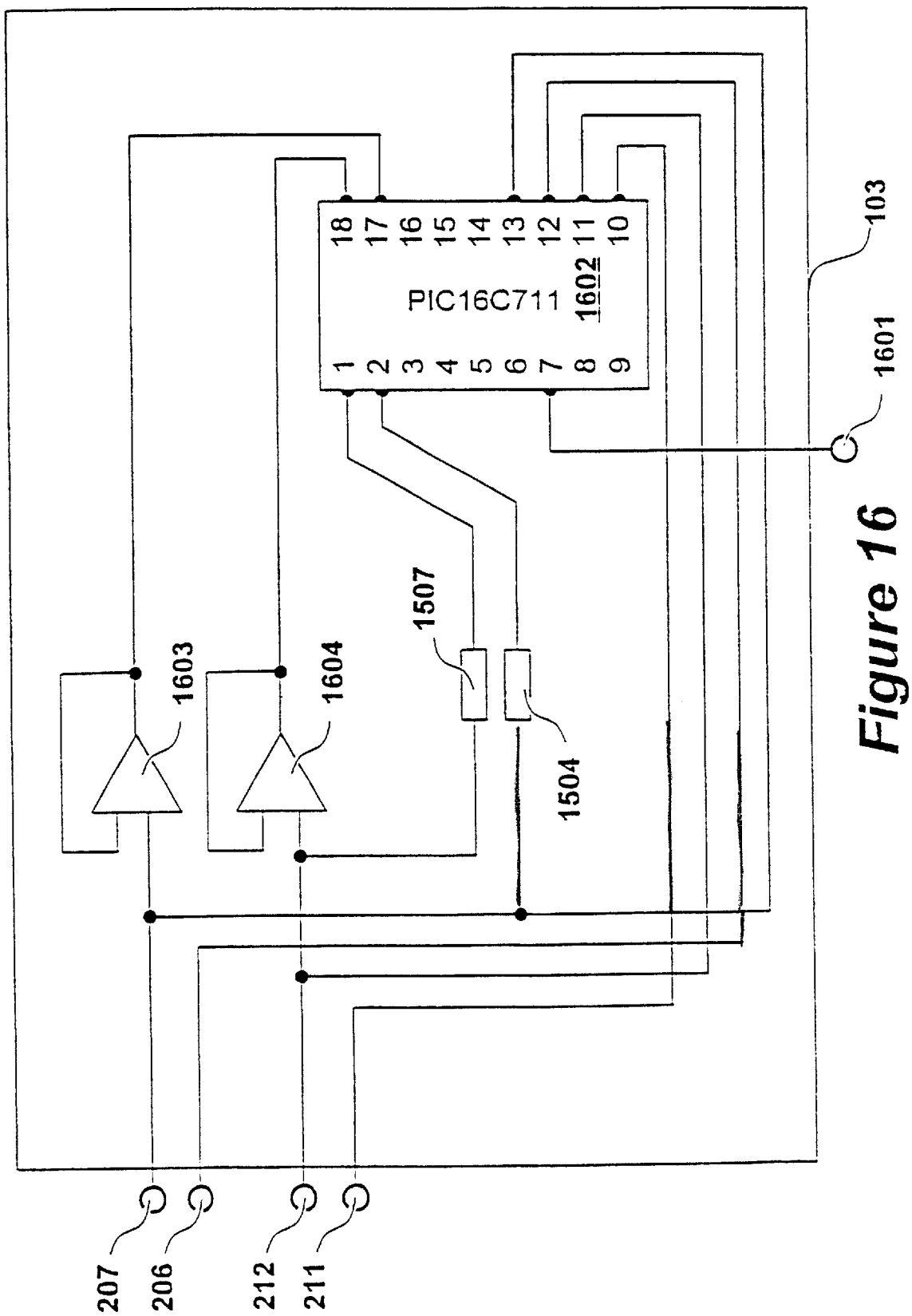
FIG. 16 shows an interface circuit of the type identified in FIG. 1.

The interface circuit 103 of FIG. 1 is shown in the circuit diagram in FIG. 16. The interface circuit supplies the necessary voltages to connectors 206, 207, 211 and 212, and measures voltages V1 ,V2, V3 and V4 as detailed above with respect to FIG. 15. The interface circuit also provides output values at serial communication output 1601, comprising values corresponding to the XY (two dimensional) position of the mechanical interaction on the sensor and a Z value depending upon area of the mechanical interaction, or area and force of the mechanical interaction.

When designing an interface circuit, resistors 1504 and 1507 are chosen according to the resistance of the sensor as measured from one connector on layer 201, to another connector on layer 202, while a typical target pressure is applied to the sensor. A value of 10 Kohms is typical for resistors 1504 and 1507.

The measurement process is controlled by a program running in a peripheral interface controller (PIC) 1602, of the type PIC16C711. As well as being capable of supplying the required output voltages at pins 1, 2, 10, 11, 12 and 13, the PIC 1602 includes an analogue to digital converter which it uses to process analogue voltages received at input pins 17 and 18. The input pins 17 and 18 receive outputs from high impedance buffers 1603 and 1604 respectively. The buffers 1603 and 1604 are half of unity gain operational amplifiers of the type TL062, and provide a high impedance buffer between the sensor output voltages and the PIC 1602 input ports.

The PIC 1602 has an external crystal oscillator (not shown) running at 4 MHz connected across pins 15 and 16. Positive five volts is supplied to pin 14 and ground is connected to pin 5. Pin 4 (the internal reset input) is held at positive five volts via a series resistor of 1 ohms.

Figure 17:
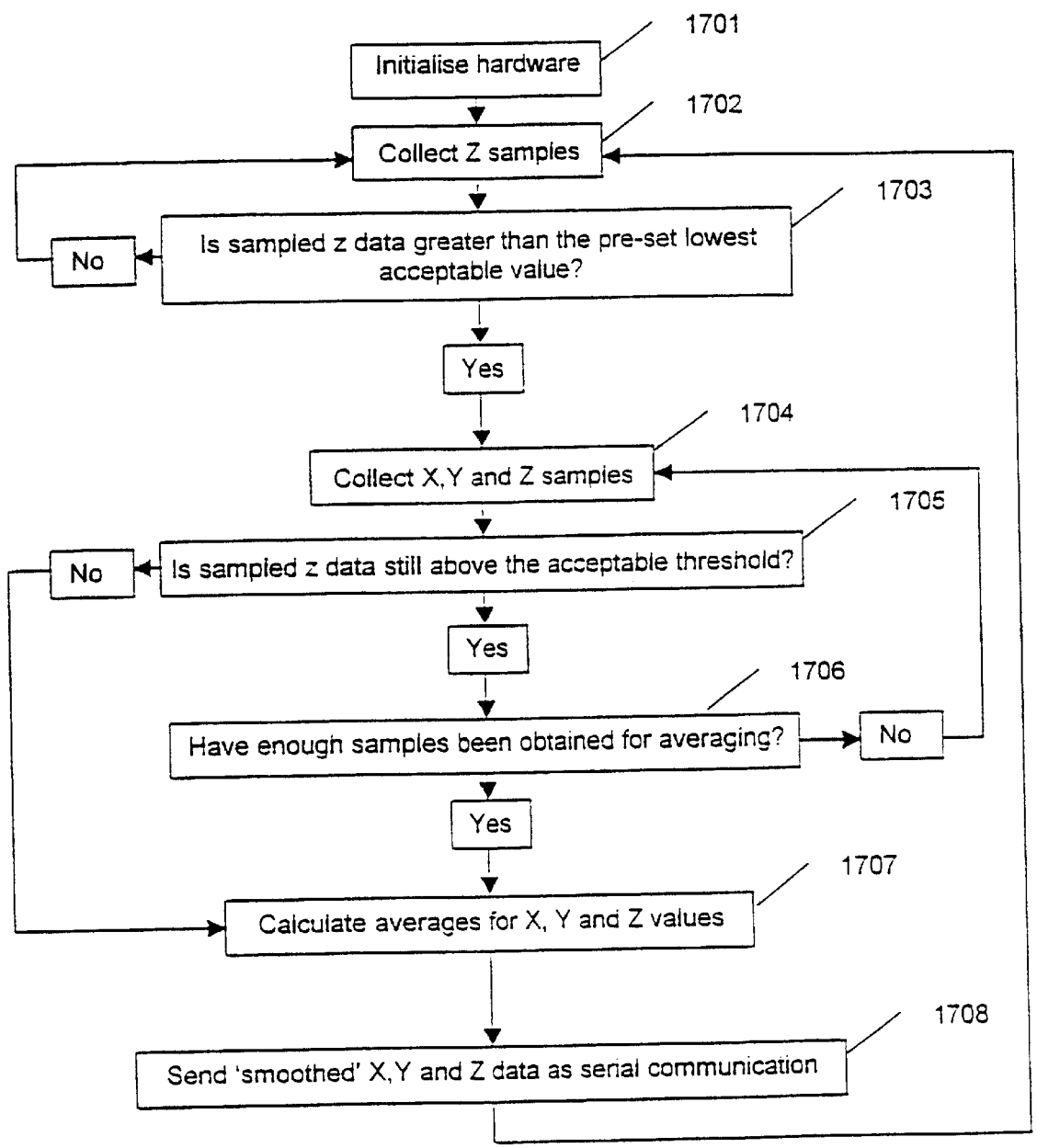
FIG. 17 illustrates a program executed by the interface circuit shown in FIG. 16.

The program running within the peripheral interface circuit of FIG. 16 is outlined in the flow chart of FIG. 17. At step 1701 the hardware is initialised and this process is detailed later with reference to FIG. 18. At step 1702 the circuit 103 measures values of voltages V1 and V2 and calculates a Z value of the interaction. The details of step 1702 are described later with reference to FIG. 19. At step 1703 a question is asked as to whether the Z data is greater than a predetermined value. If the answer to this question is no then the program returns to step 1702. Thus the circuit measures Z values until a Z value greater than a predetermined value is detected. If the answer to the question at step 1703 is yes then the circuit measures voltages V1,V2,V3 and V4 and calculates a Z value at step 1704. Step 1704 is described later in more detail with reference to FIG. 20. At step 1705 a question is asked as to whether the calculated Z value is still above the predetermined value. If the question is answered in the affirmative, a further question is asked at step 1706 as to whether enough samples have been obtained. Typically, between 3 and 10 sets of samples are taken, with lower numbers of sets of samples being taken when a fast response time is required. If the answer to the question at step 1706 is no, then the program returns to step 1704 and a further set of measurements are made. When the answer to the question at step 1706 is yes, or when the answer to the question at step 1705 is no, then the program calculates average values of the samples of the voltages V3 and V4, and of the values of Z which have been collected. Thus, the program measures a predetermined number of voltages before finding the average values, or if the Z value drops below a predetermined value, the average values are calculated immediately. By using the average of a number of samples the effect of mains power electromagnetic interference or other such environmental noise may be minimised.

A simple calculation to find an 'average' value for say the X value, is to find the mean average of the maximum and minimum values of the stored values V3. i.e. a 'smoothed' value for X is found by adding the maximum stored value of V3 to the minimum stored value of V3 and dividing the result by two.

To further improve accuracy, values of X, Y, and Z that differ by a large amount from their immediately preceding and immediately subsequent values are excluded from the calculations of the average. In addition, known methods of eliminating mains electricity supply interference may be applied to the signals received from the sensor.

At step 1708 the averaged values for V3 and V4 representing XY positional co-ordinates and the averaged values of the Z data are output at the serial communication output 1601. The program then returns to step 1702 and looks for an indication of further mechanical interaction.

Figure 18:
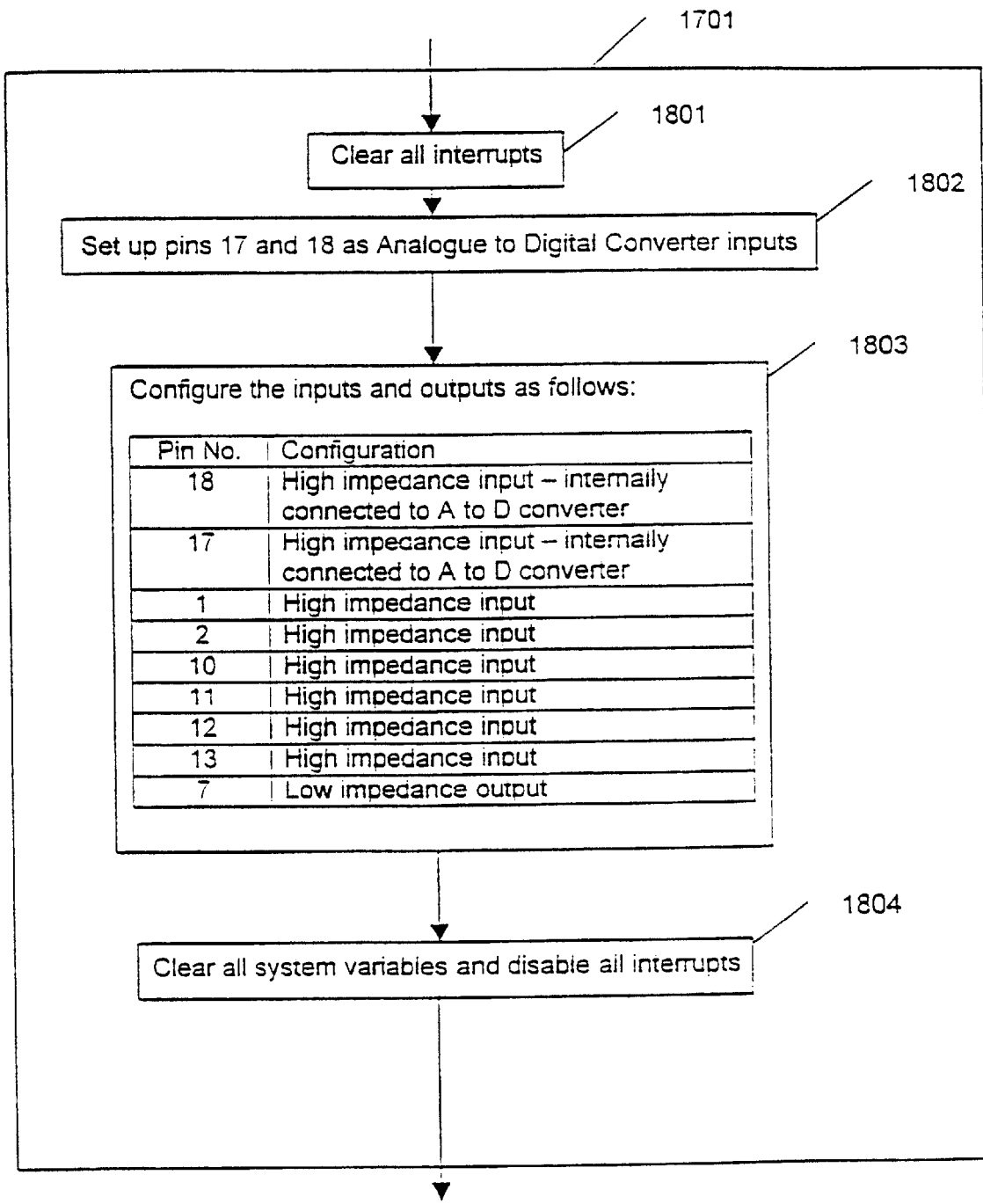
FIG. 18 details a portion of the procedure identified in FIG. 17.

Step 1701 of FIG. 17 is shown in further detail in FIG. 18. Within the initialisation step 1701, at step 1801 the interrupts are cleared and then at step 1802 pins 17 and 18 are set up as analogue to digital converter inputs. The micro ports of a PIC16C711 may be configured as low impedance outputs or high impedance inputs. When in high impedance input mode, pins 17 and 18 can be programmed to connect via an internal multiplexer, to the analogue to digital converter. At step 1803 the ports which are to be used as inputs or outputs are configured in their initial state. At step 1804 all system variables are cleared and all interrupts are disabled.

Figure 19:
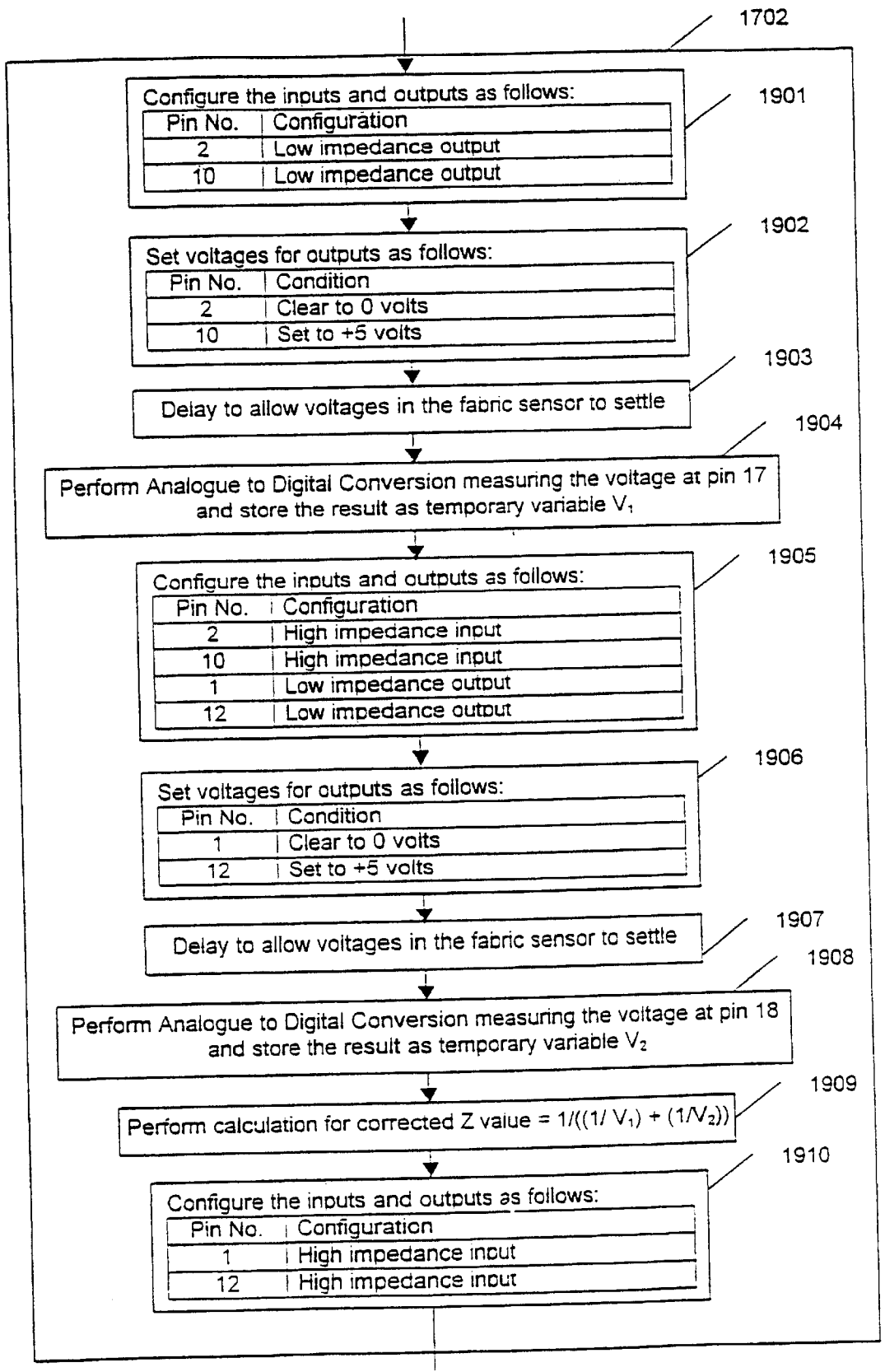
FIG. 19 details a further procedure identified in FIG. 17.

Step 1702 of FIG. 17 is shown in further detail in FIG. 19. Within step 1702, at step 1901, the ports corresponding to pins 2 and 10 are reconfigured as output ports and at step 1902 pin 2 is set to zero while pin 10 is set to positive five volts. Thus connector 207 is grounded via resistor 1504 and five volts are applied to connector 211. At step 1903 a time delay, (typically of 250 microseconds in a sensor measuring 100 millimeters by 100 millimeters with an outer layer resistance of 3.5 Kohms) is provided to allow voltages to settle before the voltage at pin 17 is measured and stored. Thus voltage V1 present at connector 207 is measured and stored.

At step 1905 pins 2 and 10 are reconfigured as high impedance inputs while pins 1 and 12 are reconfigured as low impedance outputs. At step 1906 the voltages the voltages on pins 1 and 12 are set to zero and positive five volts respectively. Thus connector 212 is grounded via resistor 1507 while five volts are supplied to connector 206. A suitable time delay, equivalent to that at step 1903, is provided at step 1907 before the voltage at pin 18 is measured and stored at step 1908. Thus the voltage present on connector 212 is measured and stored as voltage V2. At step 1909 a Z value is calculated from stored voltages V1 and V2, and then stored. The pins 1 and 12 are reconfigured back to their initial state of high impedance inputs at step 1910.

Figure 20:
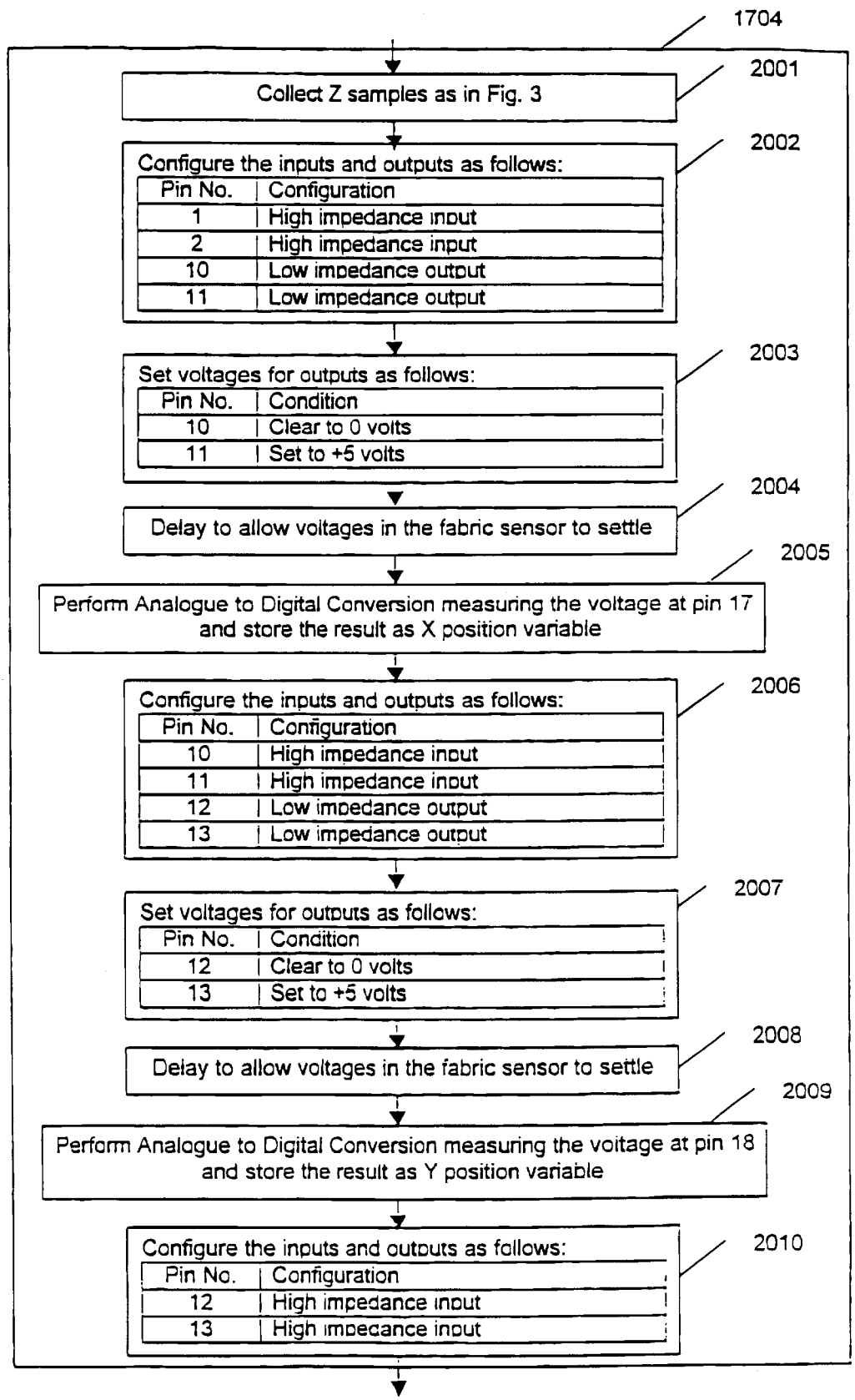
FIG. 20 details a further procedure identified in FIG. 17.

Step 1704 of FIG. 17 is shown in further detail in FIG. 20. Within step 1704, at step 2001 a Z value is collected in the same manner as at step 1702. At step 2002 pins 1 and 2 are reconfigured as high impedance inputs and pins 10 and 11 as low impedance outputs. At step 2003 pin 10 is set to zero volts and pin 11 is set to positive five volts. Thus five volts are supplied to connector 212 while connector 211 is grounded. A delay is then provided at step 2004, (of typically 1 millisecond for a device measuring 100 mm by 100 mm) to allow voltages in the sensor to settle before the voltage on pin 17 is measured at step 2005. Therefore a voltage V3 present on connector 207 is measured which provides an indication of the X position of the applied force.

Pins 10 and 11 are then reconfigured as high impedance inputs and pins 12 and 13 are reconfigured as low impedance outputs at step 2006. The voltage on pin 12 is then set to zero while the voltage on pin 13 is set to five volts at step 2007. Thus five volts are supplied to connector 207 while connector 206 is grounded. A time delay is provided at step 2008, similar to that at step 2004, before the voltage appearing at pin 18 is measured at step 2009. Thus a voltage V4 present on connector 212 is measured which provides an indication of the Y position of the applied force. Pins 12 and 13 are then reconfigured back to their initial state of high impedance inputs.

Therefore by the method described with reference to FIGS. 17 to 20 the interface circuit is able to make voltage measurements V3 and V4 which provide an indication of the position of the force applied to a fabric sensor, and measure voltages V1 and V2 which are proportional to currents passing through the sensor and provide information as to a second characteristic of the applied force. The second characteristic may be area over which the force is applied or a combination of the size of the force and said area. Furthermore, the circuit combines the voltages V1 and V2 to determine a Z value representative of the second characteristic.

The circuit 103 provides output data representative of X and Y position of the applied force and the Z value. However, in an alternative embodiment the interface circuit provides output data corresponding to the measured voltages V1, V2, V3 and V4.

I claim:

1. A position sensor for detecting the position of a mechanical interaction, said sensor including:
   a first fabric layer having electrically conductive fibres machined therein to provide a first conductive outer layer allowing conduction in all directions along the layer;
   a second fabric layer having electrically conductive fibres machined therein to provide a second conductive outer layer allowing conduction in all directions along the layer;
   a central layer disposed between said first outer layer and said second layer, said central layer including conducting means;
   a first separate insulating layer disposed between said first conductive outer layer and said central layer; and
   a second separate insulating layer disposed between said second conductive outer layer and said central layer;
   wherein said conducting means provides a conductive path between said first conducting outer layer and said second conducting outer layer at the position of a mechanical interaction, and said position sensor has electrical connections to the first and second conductive outer layers only.

2. A position sensor according to claim 1, wherein said central layer is a fabric layer which has a different compressibility than that of said outer fabric layers.

3. A position sensor according to claim 1, wherein the conductivity of said outer layers is anisotropic.

4. A position sensor according to claim 3, wherein said outer fabric layers include insulating fibres and said anisotropic conductivity is defined by ratios of conductive fibres to insulating fibres.

5. A position sensor according to claim 1, wherein the electrical resistance between said conductive outer layers is indicative of the pressure applied to the position sensor at a mechanical interaction.

6. A position sensor according to claim 1, wherein said central layer is a fabric layer comprising insulating fibres.

7. A position sensor according to claim 1, wherein said conducting means are conductive fibres.

8. A position sensor according to claim 1, wherein said central layer is a fabric layer comprising conductive fibres only.

9. A position sensor according to claim 1, wherein said central layer comprises a knitted fabric layer having a compressible structure such that it becomes more conductive when it is compressed.

10. A position sensor according to claim 1, wherein said central layer is a fabric layer comprising a mixture insulating and conductive fibres.

11. A position sensor according to claim 1, wherein said central layer is a fabric layer produced from a yarn having insulating fibres twisted together with a conductive fibre.

12. A position sensor according to claim 11, wherein said conductive fibre is less flexible than said insulating fibres, so that said conductive fibre is recessed below the general profile of the insulating fibres.

13. A position sensor according to claim 1, wherein said first insulating layer comprises a first insulating fabric comprising insulating fibres, and said second insulating layer comprises a second insulating fabric comprising insulating fibres.

14. A position sensor according to claim 1, wherein said first outer conductive layer has two electrical connectors configured to allow an electrical potential to be applied across said first outer conductive layer during position detection.

15. A position sensor according to claim 14, wherein said first outer conductive layer is anistropic such that when an electrical potential is applied between said electrical connectors to generate a voltage gradient, said first outer conductive layer is most conductive in a direction perpendicular to said voltage gradient.

16. A position sensor according to claim 1, wherein insulating functionality is provided by said central layer for which the yarn of said central layer has a conducting fibre and insulating fibres, and said conducting fibre is recessed below the profile of the insulating fibres.

17. A method of detecting the position of a mechanical interaction with a position sensor, wherein said position sensor has:
   a first fabric layer with electrically conductive fibres machined therein to provide a first conductive outer layer allowing conduction in all directions along the layer;
   a second fabric layer with electrically conductive fibres machined therein to provide a second conductive outer layer allowing conduction in all directions along the layer;
   a central layer disposed between said first outer layer and said second outer layer and including conducting means;
   a first separate insulating layer disposed between the first conductive outer layer and the central layer; and
   a second separate insulating layer disposed between said second conductive outer layer and said central layer;
   wherein said method comprises:
      providing electrical connections to the first and second outer layers only;
      applying an electrical potential to the first outer conducting layer;
      applying a force to said position sensor, such that the conducting means provides a conductive path between said first conducting outer layer and said second conducting layer at the position of the force; and
      measuring an electrical potential appearing on the second outer conducting layer.

18. A method according to claim 17, wherein the conductivity of said outer layers is anisotropic.

19. A method according to claim 17, wherein insulating functionality is provided by said central layer for which the yarn of said central layer has a conducting fibre and insulating fibres, and said conducting fibre is recessed below the profile of the insulating fibres.

20. A method according to claim 17, wherein said central layer comprises insulating fibres wrapped around a conducting fibre of a relatively larger diameter such that the extremities of resulting yarn provide insulating separating means.

21. A position sensor for detecting the position of an applied mechanical interaction, said mechanical interaction having an area and a force, said sensor comprising:
   a first fabric layer having conductive fibres machined therein to provide a first conductive outer layer;
   a second fabric layer having conductive fibres machined therein to provide a second conductive outer layer,
   a compressible inner layer disposed between said first fabric layer and said second fabric layer comprising a plurality of conductive fibres such that a conductive path is provided through said fibres when said compressible inner layer is placed in compression;
   a first separate insulating layer disposed between the first conductive outer layer and the compressible inner layer; and
   a second separate insulating layer disposed between said second conductive outer layer and said compressible inner layer;
   wherein said position sensor has electrical connections to the first and second conductive outer layers only.

22. A sensor according to claim 21, wherein the conductivity of at least one of said fabric layers is anisotropic.

23. A sensor according to claim 22, wherein said anisotropic fabric layer is manufactured by using different material types for warps and wefts of said fabric layer.

24. A sensor according to claim 22, manufactured from a warp and weft of similar fibres wherein the ratio of conductive to non-conductive fibres in said weft is different to the ratio of conductive to non-conductive fibres in said warp.

25. A position sensor according to claim 21, wherein said central layer is a fabric layer comprising insulating fibres.

26. A position sensor according to claim 21, wherein said conducting means are conductive fibres.

27. A position sensor according to claim 21, wherein said central layer comprises a knitted fabric layer having a compressible structure such that it becomes more conductive when it is compressed.

28. A position sensor according to claim 21, wherein said first insulating layer comprises a first insulating fabric comprising insulating fibres, and said second insulating layer comprises a second insulating fabric comprising insulating fibres.

29. A position sensor according to claim 21, wherein said first outer conductive layer as two electrical connectors configured to allow an electrical potential to be applied across said first outer conductive layer during position detection.

30. A position sensor according to claim 29, wherein said first outer conductive layer is anisotropic such that when an electrical potential is applied between said electrical connectors to generate a voltage gradient,
   said first outer conductive layer is most conductive in a direction perpendicular to said voltage gradient.

31. A position sensor according to claim 21, wherein insulating functionality is provided by said central layer for which the yarn of said central layer has a conducting fibre and insulating fibres, and said conducting fibre is recessed below the profile of the insulating fibres.

* * * * *